(12) United States Patent
Falconetti et al.

(10) Patent No.: US 8,761,117 B2
(45) Date of Patent: Jun. 24, 2014

(54) INTERFERENCE MITIGATION IN DOWNLINK SIGNAL COMMUNICATION TO A MOBILE TERMINAL

(75) Inventors: Laetitia Falconetti, Aachen (DE); Christian Hoymann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 203 days.

(21) Appl. No.: 13/510,376

(22) PCT Filed: Nov. 30, 2009

(86) PCT No.: PCT/EP2009/066072
§ 371 (c)(1),
(2), (4) Date: Jul. 27, 2012

(87) PCT Pub. No.: WO2011/063854
PCT Pub. Date: Jun. 3, 2011

(65) Prior Publication Data
US 2012/0281683 A1 Nov. 8, 2012

(51) Int. Cl.
*H04W 4/00* (2009.01)
(52) U.S. Cl.
USPC ............................................. 370/330
(58) Field of Classification Search
None
See application file for complete search history.

(56) References Cited

U.S. PATENT DOCUMENTS

| | | | |
|---|---|---|---|
| 2005/0221861 A1* | 10/2005 | Zeira | 455/562.1 |
| 2006/0292989 A1* | 12/2006 | Gerlach et al. | 455/63.1 |
| 2008/0146166 A1* | 6/2008 | Khan et al. | 455/78 |
| 2008/0310329 A1* | 12/2008 | Sun et al. | 370/280 |
| 2009/0075587 A1* | 3/2009 | Yu et al. | 455/7 |
| 2009/0227263 A1* | 9/2009 | Agrawal et al. | 455/452.1 |
| 2010/0041409 A1* | 2/2010 | Kim et al. | 455/450 |
| 2011/0205923 A1* | 8/2011 | Doll et al. | 370/252 |
| 2012/0008511 A1* | 1/2012 | Fan et al. | 370/252 |
| 2012/0257519 A1* | 10/2012 | Frank et al. | 370/252 |

OTHER PUBLICATIONS

Softbank Mobile Corp., "Discussion on Feedback and Signaling Information for DL MIMO and DL CoMP", 3GPP Draft, 3GPP TSG RAN WG1 Meeting #58bis, Miyazaki, Japan, Oct. 12, 2009, pp. 1-4, R1-093878, XP 50388382, 3rd Generation Partnership Project, France.

Alcatel Shanghai Bell et al., "Collaborative MIMO for LTE-A downlink", 3GPP TSG RAN WG1 Meeting #53bis, Warsaw, Poland, Jun. 30, 2008, pp. 1-6, R1-082501, XP 50110769, 3rd Generation Partnership Project, France.

Deutsche Telekom Ag et al., "Coordinated link adaptation based on multi-cell channel estimation in the LTE-A uplink", 3GPP TSG RAN WG1 Meeting #59, Jeju, South Korea, Nov. 9, 2009, pp. 1-6, R1-095067, XP 50389406, 3rd Generation Partnership Project, France.

(Continued)

*Primary Examiner* — Otis L Thompson, Jr.
(74) *Attorney, Agent, or Firm* — Coats & Bennett, P.L.L.C.

(57) ABSTRACT

In downlink signal communication to a mobile terminal (200), the mobile terminal (200) is associated with a serving access node (100-1). Signal communication to a further mobile terminal (200; 200''') may interfere with the signal communication between the serving access node (100-1) and the mobile terminal (200). In order to allow interference mitigation at the mobile terminal (200), the serving access node (100-1) obtains scheduling information pertaining to the signal communication to the further mobile terminal (200; 200'''). The obtained scheduling information is then forwarded to the mobile terminal (200) to be used for interference mitigation.

21 Claims, 10 Drawing Sheets

(56) References Cited

OTHER PUBLICATIONS

Mikami, M. et al, "Iterative MIMO Signal Detection with Inter-Cell Interference Cancellation for Downlink Transmission in Coded OFDM Cellular Systems", 2009 IEEE 69th Vehicular Technology Conference; Barcelona, Spain, Apr. 26, 2009, pp. 1-5, XP 31474573, IEEE, USA.

Qualcomm Eurpope, "Signaling for spatial coordination in DL CoMP", 3GPP TSG-RAN WG1 #57, May 4, 2009, pp. 1-10, R1-092057, XP 50339516, 3rd Generation Partnership Project, France.

Mikami, M. et al., "A Downlink Transmission Method for OFDM Cellular Systems with Inter-Cell Interference Cancellation Using Simplified MLD based on MMSE QRD-M Algorithm", Conference publication, IEEE Vehicular Technology Conference, 2008, VTC Spring 2008, May 11, 2008, pp. 2011-2015, XP 31255917, IEEE, USA.

* cited by examiner

INTERFERENCE MITIGATION IN DOWNLINK SIGNAL COMMUNICATION TO A MOBILE TERMINAL

TECHNICAL FIELD

The present invention relates to techniques for interference mitigation in a mobile communication network. More specifically, the present invention relates to techniques for interference mitigation in downlink (DL) signal communication from an access node to a mobile terminal.

BACKGROUND

Cellular communication networks generally suffer from co-channel interference. That is to say, simultaneous transmissions using the same physical resources may generate mutual interference. Co-channel interference in turn reduces quality of received signals, which may be measured as Signal to Interference plus Noise Ratio (SINR), and therefore limits capacity.

In 3GPP LTE (3GPP: Third Generation Partnership Project, LTE: Long Term Evolution), it has been proposed to use a technique cooperation between cells, which is referred to as Coordinated Multi-Point Transmission and Reception (CoMP), for enhancing the SINR of a user equipment (UE) suffering from co-channel interference. Known strategies of using CoMP in DL signal communication are implemented at the access node in the communication network. One known strategy is to use coordinated scheduling. In coordinated scheduling, cooperating cells schedule their associated UEs in such a way that co-channel interference is avoided or reduced. However, as the used capacity of the cells increases, there is less freedom to accomplish coordinated scheduling. Another known strategy is to use joint transmission. In joint transmission, cooperating cells jointly send the same data to a UE. However, joint transmission may require significant bandwidth for exchanging the transmitted data between the cooperating cells.

Accordingly, there is a need for techniques that allow for efficient interference mitigation in DL signal communication.

SUMMARY

It is an object of the present invention to meet the above need. This is achieved by methods or devices according to the independent claims. The dependent claims define further embodiments of the invention.

According to an aspect of the invention, a method for DL signal communication from a serving access node to a mobile terminal is provided. The mobile terminal is associated with the serving access node. According to the method, the serving access node obtains scheduling information. The scheduling information pertains to signal communication to a further mobile terminal. The obtained scheduling information is forwarded to the mobile terminal so as to allow for using the scheduling information for interference mitigation at the mobile terminal.

According to a further aspect of the invention, a method for DL signal communication from a serving access node to a mobile terminal is provided. The mobile terminal is associated with the serving access node. According to the method, the mobile terminal receives scheduling information from the serving access node. The scheduling information pertains to signal communication to a further mobile terminal. The mobile terminal receives a communication signal from the serving access node, and receives an interfering signal, which is due to the signal communication to the further mobile terminal. On the basis of the received scheduling information at least a signal portion of the interfering signal is removed from the communication signal.

According to a further aspect of the invention, a network device is provided. The network device is configured to operate as a serving access node of a mobile terminal. The network device comprises a wireless interface for communication with the mobile terminal, and a processor. The processor is configured to obtain scheduling information. The scheduling information pertains to signal communication to a further mobile terminal. Further, the processor is configured to forward, via the wireless interface, the obtained scheduling information to the mobile terminal so as to allow for using the scheduling information for interference mitigation at the mobile terminal.

According to a further aspect of the invention, a mobile terminal is provided. The mobile terminal comprises a wireless interface for communication with a serving access node of the mobile terminal and a processor. The processor is configured to receive, via the wireless interface, scheduling information from the serving access node. The scheduling information pertains to signal communication to a further mobile terminal. Further, the processor is configured to receive, via the wireless interface, a communication signal from the serving access node and an interfering signal due to the signal communication to the further mobile terminal. Further, the processor is configured to remove, on the basis of the received scheduling information, at least a signal portion of the interfering signal from the communication signal.

According to a further aspect of the invention, a system is provided which comprises at least one network device and at least one mobile terminal according to the above aspects.

According to a further aspect of the invention, a computer program to be executed by a processor of a network device is provided. The computer program comprises program code adapted to operate the network device as a serving access node of a mobile terminal. Further, the program code is adapted to obtain scheduling information. The obtained scheduling information pertains to signal communication to a further mobile terminal. Further, the program code is adapted to forward the scheduling information to the mobile terminal so as to allow for using the scheduling information for interference mitigation at the mobile terminal.

According to a further aspect of the invention, a computer program to be executed by a processor of a mobile terminal is provided. The computer program comprises program code adapted to receive scheduling information from a serving access node. The scheduling information pertains to signal communication to a further mobile terminal. Further, the program code is adapted to receive a communication signal from the serving access node and an interfering signal due to the signal communication to the further mobile terminal. In addition, the program code is adapted to remove, on the basis of the received scheduling information, at least a signal portion of the interfering signal from the communication signal.

DETAILED DESCRIPTION OF EMBODIMENTS

Figure 1:
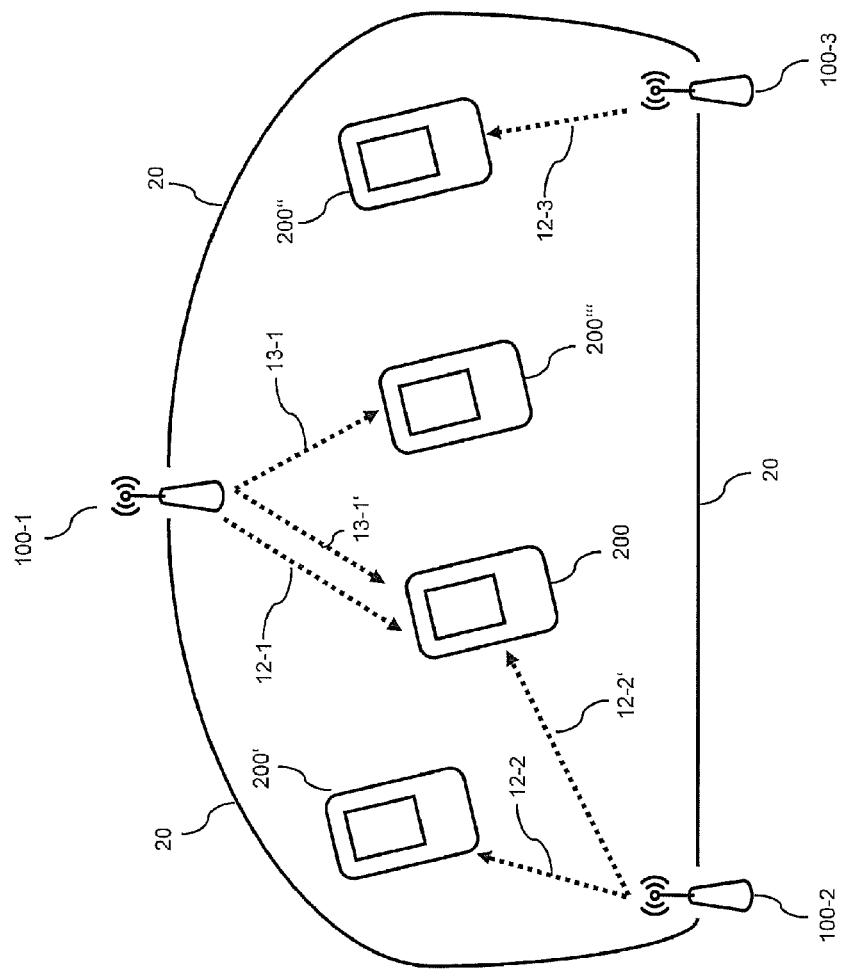
FIG. 1 schematically illustrates a communication network environment in which concepts according to embodiments of the present invention can be applied.

In the following, the invention will be explained in more detail by referring to exemplary embodiments which relate to methods, devices and computer programs for DL signal communication from an access node to a mobile terminal.

In the illustrated embodiments, an access node can be implemented in a base station (BS), e.g. an enhanced-NodeB (eNB) according to LTE terminology, or a relay node, e.g. a type-1 relay node according to LTE terminology, or a section of a BS or of a relay node. A section of a BS or of a relay node may be regarded as a unit to cover a cell area of a cellular radio frequency (RF) communication network. An access node may therefore correspond to a cell of the RF communication network. An access node typically comprises one or more antennas, RF-parts such as filters and power-amplifiers or low-noise amplifiers, and signal processing means.

Embodiments of the present invention provide techniques of DL signal communication to a mobile terminal. According to these techniques, the mobile terminal is associated with a serving access node. The serving access node controls communication of the mobile terminal with the RF communication network. In particular, the serving access node determines parameters used for the DL signal communication to its associated mobile terminal, which is also referred to as scheduling. These parameters, which may indicate a modulation scheme, a coding scheme, a precoding matrix, a reference signal, a transmit power, a frequency resource allocation, and/or a time resource allocation used for the signal communication, are also referred to as scheduling information. According to the techniques as described herein, the serving access node also obtains scheduling information which pertains to signal communication to a further mobile terminal. This signal communication may be from the serving access node to the further mobile terminal, which means that the scheduling information to be obtained is already available at the serving access node, but may be subjected to a filtering or selection process. Further, this signal communication may be from a supporting access node to the further mobile terminal. In this case, the supporting access node makes its scheduling information available to the serving access node of the mobile terminal, and the process of obtaining the scheduling information in the serving access node may involve receiving the scheduling information from the supporting access node. The serving access node of the mobile terminal then forwards the obtained scheduling information to the mobile terminal, where it is used for the purpose of interference mitigation. In other words, the serving access node transmits the scheduling information to be forwarded in such a manner that it can be used by the mobile terminal for interference mitigation. In this process, the mobile terminal will typically receive and decode a signal transmitting the forwarded scheduling information.

As mentioned above, some of the illustrated embodiments involve access-node cooperation between at least two access nodes, e.g. a first BS and a second BS, a first section of a first BS and a second section of the same BS or of a second BS, and/or a first relay node and a second relay node, a first section of a first relay node and a second section of the same relay node or of a second relay node. Cooperation between different access nodes may also be denoted as inter-base-station cooperation, inter-eNB cooperation, or inter-relay-node cooperation, and section-to-section-cooperation of the same BS or relay node may also be denoted as intra-base-station cooperation, intra-eNB cooperation, or intra-relay node cooperation. Also, it is to be understood that cooperation could also be implemented between different types of access nodes, e.g. between a BS or section of a BS and a relay node or section of a relay node. Moreover, since the access nodes may correspond to respective cells of the RF communication network, cooperation between access nodes may also be referred to as cooperation between cells or inter-cell cooperation.

According to some embodiments, the serving access node can select one or more supporting access nodes from a group of further access nodes. The selection of a further access node as supporting access node may be accomplished on the basis of a characteristic of a link between the further access node and the mobile terminal. The characteristic may comprise a signal quality of the link, e.g. a received signal strength, a path gain, a latency, or the like. The supporting access node may be a serving access node of the further mobile terminal. The scheduling information may be communicated to the serving access node of the mobile terminal in a direct manner, i.e. without passing further access nodes, or in an indirect manner, i.e. via one or more further access nodes which may be supporting access nodes as well.

In the following, embodiments of the present invention, which are based on the above concepts as outlined above, will be explained in more detail by referring to the accompanying drawings.

FIG. 1 shows a mobile communication network environment, in which concepts according to embodiments of the present invention may be applied. For example, the mobile communication network environment may be an LTE network. The mobile communication network environment comprises a plurality of access nodes 100-1, 100-2, 100-3, a mobile terminal 200, and further mobile terminals 200', 200", 200'". The mobile terminals 200, 200', 200" may be mobile phones, portable computers or other type of UE.

In the exemplary scenario of FIG. 1, the access node 100-1 is the serving access node of the mobile terminal 200 and of the mobile terminal 200'", the access node 100-2 is the serving access node of the mobile terminal 200', and the access node 100-3 is the serving access node of the mobile terminal 200". The access node 100-1 transmits a communication signal 12-1 to the mobile terminal 200 and a communication signal 13-1 to the further mobile terminal 200'", the access node 100-2 transmits a communication signal 12-2 to the mobile terminal 200', and the access node 100-3 transmits a communication signal 12-3 to the mobile terminal 200". As further illustrated, the mobile terminal 200 may also receive the communication signal 12-2 as transmitted by the access node 100-2 as an interfering signal 12-2'. Similarly, the mobile terminal 200 may also receive the communication signal 13-1 as transmitted to the further mobile terminal 200'" as an interfering signal 13-1'. Due to interference, the communication signal 12-1 as received at the mobile terminal 200 will include signal portions of the interfering signals 12-2', 13-1', which reduces the SINR. In the illustrated example, the communication signal 12-1 as received by the mobile terminal 200 is not significantly affected by interference due to the communication signal 12-3 as transmitted by the access node 100-3, e.g. due to the access node 100-3 being located at a larger distance from the mobile terminal 200 than the access node 100-2 or due to the communication signal 12-3 being transmitted at lower transmit power or using other frequency or time resources than the communication signal 12-2. It is to be understood that the above example is only one interference scenario and that, by way of example, the communication signal 12-2 as received at the mobile terminal 200' could also be affected by interference due to the communication signals 12-1, 13-1 transmitted by the access node 100-1 or by interference due to the communication signal 12-3 transmitted by the access node 100-3. Similarly, the communication signal 12-3 as received at the mobile terminal 200" could also be affected by interference due to the communication signals 12-1, 13-1 transmitted by the access node 100-1 or by interference due to the communication signal 12-2 transmitted by the access node 100-2.

For avoiding or mitigating the above types of interference, the mobile terminal 200 affected by interference is provided with scheduling information pertaining to those communication signals which cause the interference, in the illustrated example the communication signals 12-2 and 13-1. Interference mitigation at the mobile terminal 200 is then accomplished by receiving the communication signal 12-1 from the serving access node 100-1 and the interfering signal 12-2', 13-1' at the mobile terminal 200, and by removing at least a signal portion of the interfering signal 12-2', 13-1' from the received communication signal 12-1. The process of interference mitigation may involve using the scheduling information received at the mobile terminal 200 as a basis for decoding of the interfering signal 12-2', 13-1' and may be implemented as interference cancellation. Further, interference mitigation may involve using the scheduling information received at the mobile terminal 200 as a basis for calculating an interference covariance matrix of the interfering signal 12-2', 13-1' and may be implemented as interference rejection combining using a plurality of antennas to receive the interfering signal 12-2', 13-1' at the mobile terminal 200.

The scheduling information needed for interference mitigation at the mobile terminal 200 is obtained by the serving access node 100-1 and forwarded to the mobile terminal 200. In some cases, like for the communication signal 13-1, the scheduling information is already available at the serving access node 100-1. In other cases, like for the communication signal 12-2, access-node cooperation may be used to obtain the scheduling information. For this purpose, the access nodes 100-1, 100-2, 100-3 may communicate a cooperation signal 20, e.g. via a transport network. Communication links between the access nodes 100-1, 100-2, 100-3, which may be used for communicating the cooperation signal 20, may also be referred to as backhaul links. In the illustrated example, the access node 100-2 cooperates with the access node 100-1 in DL signal communication to the mobile terminal 200. In other words, the access node 100-2 is a supporting access node for DL signal communication to the mobile terminal 200.

According to some embodiments of the invention as described herein, the cooperation signals 20 are used to communicate the scheduling information of the supporting access node 100-2 to the serving access node 100-1. This may be accomplished in a direct manner, e.g. using the communication link between the serving access node 100-1 and the supporting access node 100-2. Further, this may be accomplished in an indirect manner, e.g. using the communication link between the access node 100-1 and the access node 100-3 and the communication link between the access node 100-2 and the access node 100-3. In the latter case, the scheduling information of the supporting access node 100-2 would be communicated to the serving access node 100-1 via a further access node, i.e. the access node 100-3.

It is to be understood that the process of obtaining and forwarding the scheduling information may also involve selection or filtering of specific types or items of scheduling information to be obtained by the serving access node 100-1 or to be forwarded to the mobile terminal 200.

The scheduling information obtained by the serving access node and forwarded to the mobile terminal 200 may indicate a modulation scheme, a coding scheme, a precoding matrix, a reference signal, a transmit power, a frequency resource allocation, and/or a time resource allocation used for signal communication to the further mobile terminal 200' or 200'", i.e. for transmitting the communication signal 12-2 or 13-1. The type or items of scheduling information obtained by the serving access node 100-1 or forwarded to the mobile terminal 200 may be selected depending on the requirements of the mobile terminal 200 for performing interference mitigation.

For example, if interference mitigation is implemented as interference cancellation, the obtained or forwarded scheduling information will typically indicate allocated resource blocks (RBs), i.e. a frequency resource allocation and/or a time resource allocation, a transmit power, a modulation scheme, a coding scheme, a precoding matrix, e.g. as a precoding matrix indicator (PMI), a rank indicator, reference signals or symbols, redundancy information, e.g. a Hybrid Automatic Repeat Request (HARQ) version, or the like. Such information is typically communicated on a control channel, e.g. a Physical Downlink Control Channel (PDCCH) in LTE, from a serving access node to its associated mobile terminal. Further, if interference mitigation is implemented as interference rejection combining, the received or forwarded scheduling information will typically indicate allocated resource blocks (RBs), i.e. a frequency resource allocation and/or a time resource allocation, reference signals or symbols, a transmit power, and a precoding matrix, e.g. as a precoding matrix indicator, or the like. Other scheduling information, such as a modulation scheme or a coding scheme, are not necessary but may be obtained or forwarded as well. For example, if the signal communication uses a UE specific reference signal, such as in LTE, a frequency resource allocation and/or a time resource allocation may also be used for interference-rejection combining. Accordingly, the types and items of obtained and forwarded scheduling information may depend on the interference mitigation process implemented at the mobile terminal 200. The scheduling information may be forwarded to the mobile terminal on a control channel, e.g. the PDCCH in LTE, or on a data channel, e.g. the Physical Downlink Shared Channel (PDSCH) in LTE.

It is to be understood that an arbitrary number of access nodes could cooperate in various combinations. For example, the access node 100-3 could be a supporting access node for DL signal communication to the mobile terminal 200 as well. Further, the access node 100-1 could be a supporting access node for DL signal communication to the mobile terminal 200' and/or to the mobile terminal 200". In the latter case, the access node 100-1 will transmit its scheduling information, i.e. scheduling information used for transmitting the communication signal 12-1 to the mobile terminal 200, to a further access node, e.g. the access node 100-2 or 100-3. Moreover, it is to be understood that further access nodes (not illustrated) could participate as supporting access nodes for DL signal communication to one or more of the mobile terminals 200, 200', 200", 200'".

Figure 2:
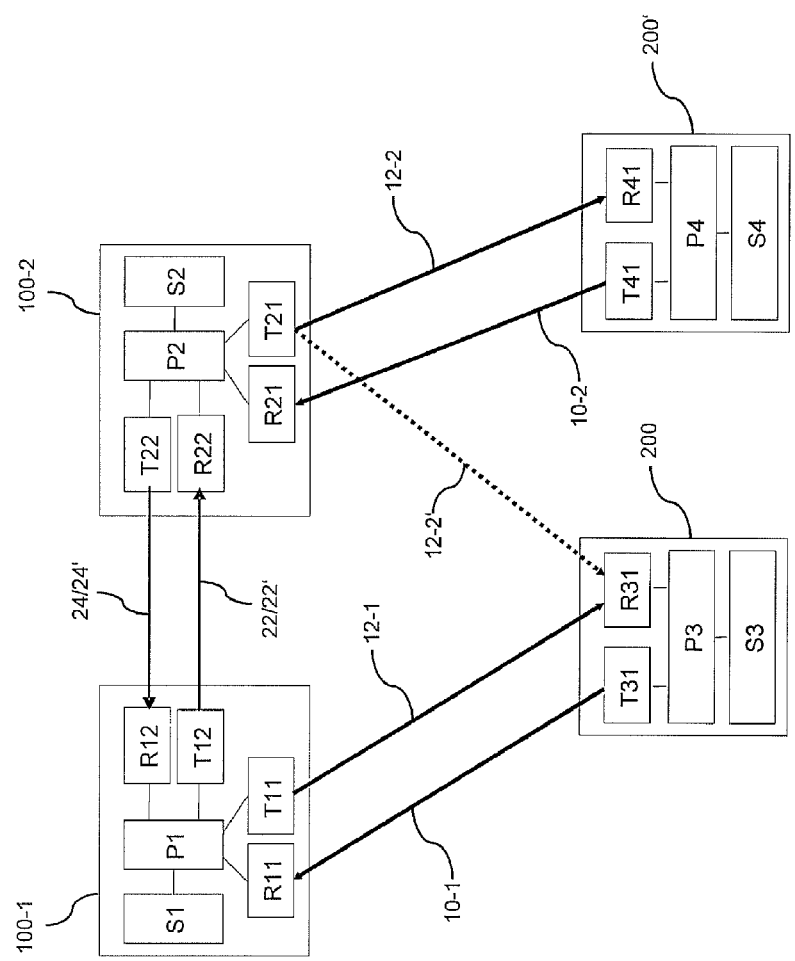
FIG. 2 schematically illustrates an implementation of devices in a communication network according to an embodiment of the invention.

FIG. 2 schematically illustrates an exemplary implementation of devices according to an embodiment of the invention which relates to access-node cooperation in DL signal communication. Further, FIG. 2 also illustrates communication between these devices. In FIG. 2, elements which are similar to those of FIG. 1 have been designated with the same reference signs. Additional information concerning these elements can thus be obtained from the above explanations in connection with FIG. 1.

In FIG. 2, the access node 100-1, the access node 100-2 the mobile terminal 200, and the mobile terminal 200' are depicted. In the following, the access node 100-1 may also be referred to as first access node, and the access node 100-2 may also be referred to as second access node. Similarly, the mobile terminal 200 may also be referred to as first mobile terminal, and the mobile terminal 200' may also be referred to as further mobile terminal or second mobile terminal.

As explained in connection with FIG. 1, for the first mobile terminal 200, the first access node 100-1 is the serving access node. In other words, the mobile terminal 200 is associated with the first access node 100-1. For the second mobile terminal 200', the second access node 100-2 is the serving access node. In other words, the second mobile terminal 200' is associated with the second access node 100-2.

It is assumed that the access node 100-2 was selected as supporting access node for cooperation with the access node 100-1 so as to allow for interference mitigation at the mobile terminal 200. Accordingly, from a perspective of cooperation of the access nodes 100-1, 100-2 in DL signal communication to the mobile terminal 200, the access node 100-1 is the serving access node, and the access node 100-2 is the supporting access node.

Again, it is to be understood that there may be one or more further access nodes, which are not illustrated in FIG. 2. These further access nodes may be candidates to be selected as supporting access nodes or may be already selected as supporting access nodes. Further, there may be one or more further access nodes that do not qualify to be used as supporting access nodes, e.g. because there exists no direct or indirect backhaul link between the serving access node 100-1 and these one or more further access nodes. Further, there could also be further mobile terminals, which are not illustrated in FIG. 2. These mobile terminals could be associated with one of the access nodes 100-1, 100-2 or to any further access node.

Further, it should again be noted that an access node, e.g. one of the access nodes 100-1, 100-2, can be a serving access node for a particular mobile terminal while it is a supporting access node for another terminal. If the mobile terminal moves and a another access node takes over the role of the serving access node, the previous serving access node may take over the role of a supporting access node or may not be considered anymore for cooperation.

The illustrated individual devices 100-1, 100-2, 200, and 200' each comprise one or more sub-units with a sub-unit starting with T denoting a transmission unit or transmitter, a sub-unit starting with R denoting a receiving unit or receiver, a sub-unit starting with P denoting a processing unit or processor, and a sub-unit starting with S denoting a storage unit or memory.

The mobile terminal 200 comprises a transmitter T31 for transmitting a communication signal 10-1 to its serving access node, i.e. the first access node 100-1. In some situations, the communication signal 10-1 as transmitted by the mobile terminal 200 may also be received as an interfering signal (not illustrated) by another access node, e.g. the second access node 100-2. Further, the mobile terminal 200 comprises a receiver R31, which allows for receiving the communication signal 12-1 from its associated serving access node, i.e. from the first access node 100-1. At the same time, the receiver R31 may also receive one or more interfering signals from other access nodes, e.g. the interfering signal 12-2' from the second access node 100-2. According to some embodiments, the receiver R31 may be equipped with multiple antennas, which allows for signal reception on multiple channels.

The transmitter T31 and the receiver R31 of the mobile terminal 200 implement a wireless interface of the mobile terminal 200, which allows for communicating with the first access node 100-1 or other access nodes according to a wireless communication technology, e.g. LTE. It is to be understood that the transmitter T31 and the receiver R31 may be combined in a single device, which may be referred to as a transceiver or transceiver unit.

In addition, the mobile terminal 200 comprises a processor P3 for controlling operations of the mobile terminal 200, for processing of received signals, e.g. the communication signal 12-1 and the interfering signal 12-2', for processing of signals to be transmitted, e.g. the communication signal 10-1, or the like. Moreover, the mobile terminal 200 comprises a storage unit S3 for storing and retrieving information or data, e.g. program code data to be executed by the processor or information or parameters used for processing of signals by the processor P3.

It should be noted that for some of the concepts as described herein the transmitter T31 is optional and may be omitted. However, typical mobile terminals, such as mobile phones, will comprise such a transmitter. Nonetheless, it is also conceivable that the mobile terminal 200 is implemented without transmission functionalities, e.g. as a pager-type device or as a media-player device. Also, it is to be understood that the processor P3 and/or the storage unit S3 could at least in part be replaced by dedicated signal processing hardware.

According to an embodiment of the invention, the processing unit P3 of the mobile terminal 200 is configured to accomplish interference mitigation at the mobile terminal 200. For this purpose, the processor P3 is supplied with the communication signal 12-1 as received from the serving access node of the mobile terminal, i.e. from the first access node 100-1, and removes at least a signal portion of the interfering signal received 12-2' as received from the supporting access node 100-2. Further details of the interference mitigation process will be explained below.

According to some embodiments, the processor P3 may also be configured to measure a characteristic of a link between its serving access node, i.e. the first access node 100-1, and the mobile terminal 200, e.g. the link used for transmitting the signal 10-1 from the mobile terminal 200 to the first access node 100-1 and/or for transmitting the signal 12-1 from the first access node 100-1 to the mobile terminal 200. For example, this may be accomplished by measuring a received signal strength of the communication signal 12-1. Further, the processor P3 may also be configured to measure a characteristic of a link between a further access node, e.g. the access node 100-2, and the mobile terminal 200, e.g. the link on which the interfering signal 12-2' is received from the second access node 100-2. For example, this may be accomplished by measuring a received signal strength on the link. The processor P3 may further be configured to make results of such measurements available to its associated serving access node, i.e. to the first access node 100-1, e.g. by sending a measurement report using the signal 10-1. In some embodiments, such a measurement report may be a path gain measurement report.

The further mobile terminal 200' has similar structures and functionalities as the mobile terminal 200. In particular the further mobile terminal 200' comprises a transmitter T41 for transmitting a communication signal 10-2 to the access node 100-2, i.e. to its associated serving access node. In some situations, the communication signal 10-2 as transmitted by the further mobile terminal 200' may also be received as an interfering signal (not illustrated) by another access node, e.g. the access node 100-1. In addition, the further mobile terminal 200' comprises a receiver R41, which allows for receiving the communication signal 12-2 from the access node 100-2. At the same time, the receiver R41 may also receive one or more interfering signals from other access nodes. According to an embodiment, the receiver R41 may be equipped with multiple antennas, which allows for signal reception on multiple channels.

The transmitter T41 and the receiver R41 of the further mobile terminal 200' implement a wireless interface of the mobile terminal 200', which allows for communicating with the second access node 100-2 or other access nodes according to a wireless communication technology, e.g. LTE. It is to be understood that the transmitter T41 and the receiver R41 may be combined in a single device, which may be referred to as a transceiver or transceiver unit.

In addition, the further mobile terminal 200' comprises a processor P4 for controlling operations of the further mobile terminal 200', for processing of received signals, e.g. the communication signal 12-2, for processing of signals to be transmitted, e.g. the communication signal 10-2, or the like. Moreover, the further mobile terminal 200' comprises a storage unit S4 for storing and retrieving information or data, e.g. program code data to be executed by the processor or information or parameters used for processing of signals by the processor P4.

It should be noted that for the concepts as described herein the transmitter T41 is optional. However, typical mobile terminals, such as mobile phones, will comprise such a transmitter. Nonetheless, it is also conceivable that the further mobile terminal 200' is implemented without transmission functionalities, e.g. as a pager-type device or as a media-player device. Also, it is to be understood that the processor P4 and/or the storage unit S4 could at least in part be replaced by dedicated signal processing hardware.

According to an embodiment of the invention, the processing unit P4 of the further mobile terminal 200' is configured to accomplish interference mitigation at the mobile terminal 200'. However, in the following, interference mitigation functionalities will only be explained for the mobile terminal 200.

According to some embodiments, the processor P4 may also be configured to measure a characteristic of a link between the second access node 100-2 and the further mobile terminal 200', e.g. the link used for transmitting the signal 10-2 from the further mobile terminal 200' to its associated serving access node, i.e. the second access node 100-2, and/or for transmitting the communication signal 12-2 from the access node 100-2 to the further mobile terminal 200'. For example, this may be accomplished by measuring a received signal strength of the communication signal 12-2. Further, the processor P4 may also be configured to measure a characteristic of a link between a further access node, e.g. the first access node 100-1, and the further mobile terminal 200'. For example, this may be accomplished by measuring a received signal strength. The processor P4 may further be configured to make results of such measurements available to its associated serving access node, i.e. the access node 100-2, which may be accomplished by sending a measurement report using the signal 10-2. In some embodiments, such a measurement report may be a path gain measurement report.

The first access node 100-1 comprises a receiver R11 for receiving the communication signal 10-1 from the mobile terminal 200 or for receiving communication signals from other mobile terminals. The first access node 100-1 further comprises a transmitter T11 for transmitting the communication signal 12-1 to the mobile terminal 200 or for transmitting communication signals to other mobile terminals.

The transmitter T11 and the receiver R11 of the first access node 100-1 implement a wireless interface of the first access node 100-1, which allows for communicating with the mobile terminal 200 or other mobile terminals according to a wireless communication technology, e.g. LTE. It is to be understood that the transmitter T11 and the receiver R11 may be combined in a single device, which may be referred to as a transceiver or transceiver unit.

It should be noted that in some embodiments, e.g. if the mobile terminals are implemented without transmission functionalities, the receiver R11 may be omitted. However, most access nodes, such as LTE BSs, will comprise such a receiver for bi-directional communication with mobile terminals. Nonetheless, it is also conceivable that the first access node 100-1 is implemented without receiving functionalities with respect to mobile terminals.

As further illustrated, the first access node 100-1 comprises a processor P1, and a storage unit S1. The access node 100-1 may thus be provided with a processing capability for controlling operations of the first access node 100-1, for processing of signals to be transmitted, and for processing exchanged or received signals or information, and/or with a storage capability for storing information or data, e.g. program code data to be executed by the processor P1.

According to some embodiments, the processor P1 is configured to determine a characteristic of the link between the first access node 100-1 and the mobile terminal 200. This may be accomplished by receiving the above-mentioned measurement report of the mobile terminal 200. In addition, this may be accomplished by measuring a reference signal received from the mobile terminal 200, e.g. by measuring the received signal strength, measuring a path gain, or measuring a latency. Moreover, the processor P1 may be configured to determine a characteristic of the link between a further access node, e.g. the access node 100-2, and the mobile terminal 200. This may be accomplished by receiving a measurement report for the link from the mobile terminal 200 or by receiving a measurement report from the further access node. Further, the processor P1 may be configured to determine a characteristic of the link between the first access node 100-1 and the mobile terminal 200'. This may be accomplished by measuring a reference signal received from the mobile terminal 200', e.g. by measuring the received signal strength, measuring a path gain, or measuring a latency. This may also be accomplished by receiving a measurement report for the link from the mobile terminal 200', either directly or via a further access node, e.g. the access node 100-2.

The second access node 100-2 has similar structures and functionalities as the first access node 100-1. In particular, the second access node 100-2 comprises a receiver R21 for receiving a communication signal 10-2 from the mobile terminal 200' or for receiving communication signals from other mobile terminals. The second access node 100-2 further comprises a transmitter T21 for transmitting the communication signal 12-2 to the mobile terminal 200' or for transmitting communication signals to other mobile terminals.

The transmitter T21 and the receiver R21 of the second access node 100-2 implement a wireless interface of the second access node 100-2, which allows for communicating with the mobile terminal 200' or other mobile terminals according to a wireless communication technology, e.g. LTE. It is to be understood that the transmitter T21 and the receiver R21 may be combined in a single device, which may be referred to as a transceiver or transceiver unit.

It should be noted that in some embodiments, e.g. if the mobile terminals are implemented without transmission functionalities, the receiver R21 may be omitted. However, most access nodes, such as LTE BSs, will comprise such a receiver for bi-directional communication with mobile terminals. Nonetheless, it is also conceivable that the second access node 100-2 is implemented without receiving functionalities with respect to mobile terminals.

As further illustrated, the second access node 100-2 comprises a processor P2, and a storage unit S2. The second access node 100-2 may thus be provided with a processing capability for controlling operations of the access node 100-2, for processing of signals to be transmitted, and for processing exchanged or received signals or information, and/or with a storage capability for storing information or data, e.g. program code data to be executed by the processor P2.

According to some embodiments, the processor P2 is configured to determine a characteristic of the link between the second access node 100-2 and the further mobile terminal 200'. This may be accomplished by receiving the above-mentioned measurement report of the further mobile terminal 200'. In addition, this may be accomplished by measuring a reference signal received from the further mobile terminal 200', e.g. by measuring the received signal strength, measuring a path gain, or measuring a latency. Moreover, the processor P2 may be configured to determine a characteristic of the link between a further access node, e.g. the first access node 100-1, and further the mobile terminal 200'. This may be accomplished by receiving a measurement report for the link from the mobile terminal 200' or by receiving a measurement report from the further access node. Further, the processor P2 may be configured to determine a characteristic of the link between the second access node 100-2 and the mobile terminal 200. This may be accomplished by measuring a reference signal received from the mobile terminal 200, e.g. by measuring the received signal strength, measuring a path gain, or measuring a latency. This may also be accomplished by receiving a measurement report for the link from the mobile terminal 200, either directly or via a further access node, e.g. the access node 100-1.

In addition, the first access node 100-1 comprises a transmitter T12 for transmitting signals to other access nodes, e.g. to the second access node 100-2, and a receiver R12 for receiving signals from other access nodes, e.g. from the second access node 100-2. Similarly, the second access node 100-2 comprises a transmitter T22 for transmitting signals to other access nodes, e.g. to the first access node 100-1, and a receiver R22 for receiving signals from other access nodes, e.g. from the first access node 100-1. The transmitter T12 and the receiver R12 thus implement an inter-access node interface of the first access node 100-1, which allows for communication with other access nodes, e.g. the second access node 100-2. Similarly, the transmitter T22 and the receiver R22 thus implement an inter-access node interface of the second access node 100-2, which allows for communication with other access nodes, e.g. the first access node 100-1.

The transmitter T12 and the receiver R22 may be connected directly, e.g. with a cable, or indirectly, e.g. through any wireless or wired transport network with intermediate switching and/or routing nodes. Similarly, the transmitter T22 and the receiver R12 may be connected directly, e.g. with a cable, or indirectly, e.g. through any wireless or wired transport network with intermediate switching and/or routing nodes.

Accordingly, the first access node 100-1 and the second access node 100-2 may communicate via dedicated physical connection, e.g. cable or fiber, directly connecting the first access node 100-1 and the second access node 100-2.

According to another example, the first access node 100-1 and the second access node 100-2 may communicate via a switched or routed communication network with intermediate switching or routing nodes. An example for an interconnection of access nodes suitable for implementing the concepts as described herein is the interface X2 according to the 3GPP LTE specification, which is an IP-based interface being independent of the underlying transport network.

Using its inter-access node interface, the serving access node 100-1 can request scheduling information relating to the communication signal 12-2 as transmitted by the supporting access node 100-2 to the terminal 200'. As explained above, the communication signal 12-2 is also received by the mobile terminal 200 as the interfering signal 12-2'. The scheduling information can be requested by sending a request message 22 from the serving access node 100-1 to the supporting access node 100-2 or by sending a subscribe message 22' from the serving access node 100-1 to the supporting access node 100-2. The request message 22 and the subscribe message 22' will be further explained below. In the supporting access node 100-2, the request message 22 or the subscribe message 22' is received using the inter-access node interface of the supporting access node 100-2. The processor P2 evaluates the request message 22 or subscribe message 22' and transmits the requested scheduling information to the serving access node 100-1 by transmitting a response message 24 in response to the request message 22, or by transmitting one or more publish messages in response to the subscribe message 22'. The response message 24 or the publish messages 24' are communicated via the inter-access node interfaces, i.e. the transmitter T22 and the receiver R12. Further details of the response message 24 and of the publish messages 24' will be explained below. The processing unit P1 of the serving access node 100-1 receives the scheduling information of the supporting access node 100-2 and forwards the received scheduling information to the mobile terminal 200, which is accomplished using the wireless interfaces of the serving access node 100-1 and of the mobile terminal 200, i.e. the transmitter T11 and the receiver R31. The scheduling information may be forwarded as received or may be subjected to a selection process, a filtering process, or other type of processing. At the mobile terminal 200, the scheduling information is then used in the interference mitigation process.

In addition, the inter-access node interfaces of the access nodes 100-1, 100-2, as implemented by the transmitters T12, T22 and the receivers R12, R22, may be used for communicating information relating to the above-mentioned link characteristics, e.g. for communicating measurement reports. In particular, information relating to a characteristic of the link between the access node 100-2 and the mobile terminal 200 may be communicated from the access node 100-2 to the access node 100-1. As mentioned above, such characteristics communicated between the access node 100-1, 100-2 may relate to a signal quality of the link. The processing unit P1 in the serving access node 100-1 may then use the information concerning the link characteristics as a basis for deciding whether the access node 100-2 should be used as supporting access node or not. This will be further explained in connection with FIGS. 4 and 5.

Figure 3:
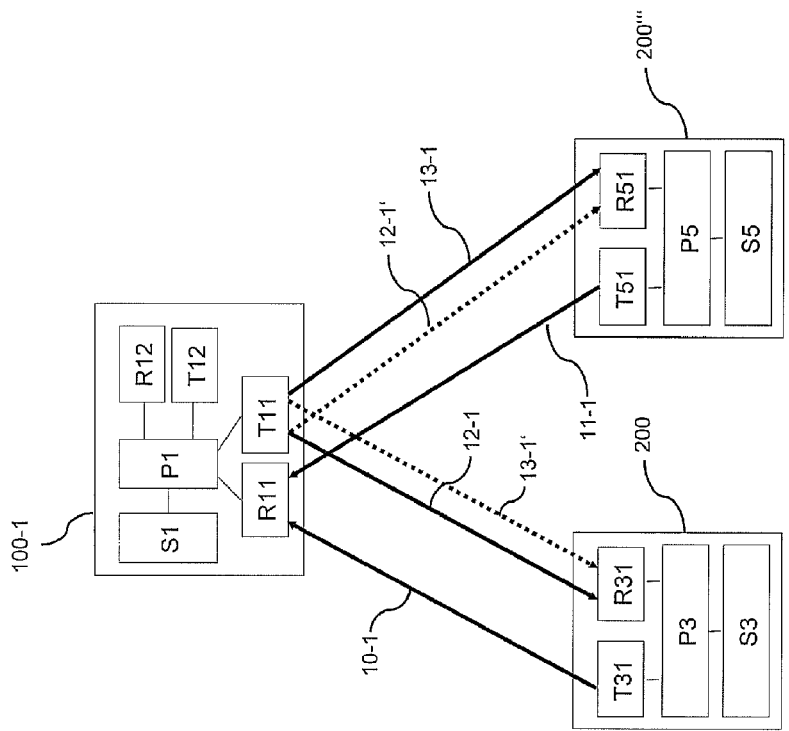
FIG. 3 schematically illustrates an implementation of devices in a communication network according to a further embodiment of the invention.

FIG. 3 schematically illustrates an exemplary implementation of devices according to a further embodiment of the invention which relates to a multi-user MIMO scenario (MIMO: Multiple Input Multiple Output) in DL signal communication. Further, FIG. 3 also illustrates communication between these devices. In FIG. 3, elements which are similar to those of FIGS. 1 and 2 have been designated with the same reference signs. Additional information concerning these elements can thus be obtained from the above explanations in connection with FIGS. 1 and 2.

In FIG. 3, the access node 100-1, the mobile terminal 200, and the mobile terminal 200''' are depicted. In the following, the mobile terminal 200 may also be referred to as first mobile terminal, and the mobile terminal 200''' may also be referred to as further mobile terminal.

As explained in connection with FIG. 1, for the first mobile terminal 200, the access node 100-1 is the serving access node. In other words, the mobile terminal 200 is associated with the first access node 100-1. For the second mobile terminal 200''', access node 100-1 is the serving access node as well. In other words, the second mobile terminal 200''' is associated with the access node 100-1 as well.

The further mobile terminal 200''' has similar structures and functionalities as explained above for the mobile terminals 200, 200'. In particular the further mobile terminal 200''' comprises a transmitter T51 for transmitting a communication signal 11-1 to the access node 100-1, i.e. to its associated serving access node. In some situations, the communication signal 11-1 as transmitted by the further mobile terminal 200''' may also be received as an interfering signal (not illustrated) by another access node. In addition, the further mobile terminal 200''' comprises a receiver R51, which allows for receiving the communication signal 13-1 from the access node 100-1. At the same time, the receiver R51 may also receive one or more interfering signals from other access nodes. According to an embodiment, the receiver R51 may be equipped with multiple antennas, which allows for signal reception on multiple channels.

The transmitter T51 and the receiver R51 of the further mobile terminal 200''' implement a wireless interface of the mobile terminal 200''', which allows for communicating with the access node 100-1 or other access nodes according to a wireless communication technology, e.g. LTE. It is to be understood that the transmitter T51 and the receiver R51 may be combined in a single device, which may be referred to as a transceiver or transceiver unit.

In addition, the further mobile terminal 200''' comprises a processor P5 for controlling operations of the further mobile terminal 200''', for processing of received signals, e.g. the communication signal 13-1, for processing of signals to be transmitted, e.g. the communication signal 11-1, or the like. Moreover, the further mobile terminal 200''' comprises a storage unit S5 for storing and retrieving information or data, e.g. program code data to be executed by the processor or information or parameters used for processing of signals by the processor P5.

It should be noted that for the concepts as described herein the transmitter T51 is optional. However, typical mobile terminals, such as mobile phones, will comprise such a transmitter. Nonetheless, it is also conceivable that the further mobile terminal 200''' is implemented without transmission functionalities, e.g. as a pager-type device or as a mediaplayer device. Also, it is to be understood that the processor P5 and/or the storage unit S5 could at least in part be replaced by dedicated signal processing hardware.

According to an embodiment of the invention, the processing unit P5 of the further mobile terminal 200''' is configured to accomplish interference mitigation at the mobile terminal 200''. However, in the following, interference mitigation functionalities will only be explained for the mobile terminal 200.

The access node 100-1 as illustrated in FIG. 3 has similar structures and functionalities as explained in connection with FIG. 2. However, it should be noted that for the concepts of interference mitigation as explained in connection with FIG. 3, the inter-access node interfaced implemented by the receiver R12 and the transmitter T12 is optional. Moreover, no functionalities with respect to selecting supporting access nodes are needed.

As illustrated in FIG. 3, the access node 100-1 uses the transmitter T11 to transmit the communication signal 12-1 to the mobile terminal 200 and to transmit the communication signal 13-1 to the further mobile terminal 200''. For this purpose, the transmitter T11 may be configured for a multi-channel operation using multiple antennas and/or multiple transmitter sub-units. The communication signal 13-1 is received at the mobile terminal 200 as the interfering signal 13-1'.

The structures and functionalities of the mobile terminal 200 are similar to those as explained above. However, in the interference scenario of FIG. 3, the receiver R31 of the mobile terminal 200 receives the interfering signal 13-1' from the access node 100-1. For accomplishing interference mitigation at the mobile terminal 200, the processor P3 of the mobile terminal is supplied with the communication signal 12-1 as received from the serving access node of the mobile terminal 200, i.e. from the access node 100-1, and removes at least a signal portion of the interfering signal received 13-1' as received from the access node 100-1. This accomplished on the basis of scheduling information pertaining to the communication signal 13-1, which is forwarded to the mobile terminal 200 by the serving access node 100-1. The process of interference mitigation may be an interference cancellation based process or an interference-rejection combining based process. Further details of such interference mitigation processes on the basis scheduling information will be explained below.

In the interference scenario of FIG. 3, the scheduling information needed by the mobile terminal 200 for accomplishing interference mitigation is already available at the access node 100-1, which is the serving access node for both the mobile terminal 200 and the further mobile terminal 200''. Accordingly, the access node 100-1 may obtain the scheduling information to be forwarded from the scheduling process with respect to the further mobile terminal 200''', e.g. from its storage unit S1. In addition, filtering or selection of the available scheduling information may be accomplished at the access node 100-1. For example, the access node 100-1 may use a link characteristic of the link to the mobile terminal 200 and/or a link characteristic of the link to the further mobile terminal 200''' as a basis for deciding whether some or all scheduling information pertaining to the communication signal 13-1 should be forwarded to the mobile terminal 200.

Such a link characteristic may represent a signal quality, e.g. a received signal strength, a signal-to-noise-ratio, a path gain, or the like. For example, if the link characteristic indicates that the signal quality of the interfering signal 13-1' as received at the mobile terminal is too low for accomplishing interference mitigation, the access node 100-1 may decide not to forward any scheduling information pertaining to the communication signal 13-1 to the mobile terminal 200. Further, as mentioned above, the types and items of forwarded scheduling information may depend on the interference mitigation process implemented by the mobile terminal 200.

In the following processes for selection of supporting access nodes according to embodiments of the invention will be further explained.

For access-node cooperation in DL signal communication as described herein, it is desirable to determine which access node or access nodes should participate as supporting access node. This decision is typically made in the serving access node.

Before actually selecting one or more supporting access nodes, the serving access node identifies a mobile terminal requiring cooperation, e.g. a mobile terminal located at a cell edge and suffering from low carrier strength and/or high co-channel interference of the communication signal received from the serving access node.

For each mobile terminal that requires cooperation, the serving access node can compile a set of potentially supporting access nodes. For this purpose, it can use a measurement report of the mobile terminal as mentioned above. In some cases such a measurement report may already exist since it has been established for identifying potential handover candidate access nodes. Accordingly, the measurement report may show access nodes which are potential handover target access nodes. Such measurement reports are typically sent in regular intervals to the serving access node. According to some embodiments of the present invention, the measurement report may also serve to identify access nodes whose communication signals are received within a certain level of quality at the mobile terminal. The serving access node can determine a set of potentially cooperating access nodes from the measurement report.

For example, the measurement report may indicate access having the best wireless channels towards the given mobile terminal. All the indicated access nodes qualifying as potential handover candidates, sometimes referred to as active set, may then be included into a list of potentially supporting access nodes. Alternatively or in addition, the list of potentially supporting access nodes may be based on location information of access nodes, may be based on the deployment structure and the physical connection of access nodes, may configured by an operations and maintenance (O&M) system, or it may be pre-configured during system setup.

In addition or as an alternative, one or more of the following criteria may be applied in the process of selecting one or more supporting access node:

Access-node cooperation is particularly beneficial when the signal quality of the link from the supporting access node to the mobile terminal is close to the signal quality of the link from the serving access node to the mobile terminal. Thus, the difference ($\Delta$RSS) between the signal quality of the link from a potentially supporting access node, denoted by $R_c$, and the signal quality of the link from the serving access node, denoted by $R_s$, could serve as one parameter to select one or more supporting access nodes. According to some embodiments, the list of candidates is reduced to access nodes whose $\Delta$RSS is below a certain threshold $\Delta RSS_{thresh}$, i.e. fulfils the relation $|R_s - R_c| < \Delta RSS_{thresh}$. The signal quality may be measured as a received signal strength. The information concerning the signal quality of the link may be obtained by making measurements at the mobile terminal, at the serving access node, or at the potentially supporting access nodes. If necessary, the information may be communicated to the serving access node by dedicated messages or by measurement reports.

Access nodes may have different limitations with respect to their backhaul link, e.g. some may be connected via fibre, others via a wired connection (e.g. via E1), some even via a wireless connection, e.g. self-backhauling (e.g. via LTE links). Thus, the backhaul limitation of potentially supporting access nodes may serve as parameter to select one or more supporting access nodes. According to some embodiments, the list of candidates may thus be reduced to access nodes whose backhaul is able to cope with the additional load due to cooperation. The information about the currently available backhaul capacity of certain access nodes could be exchanged via the above mentioned inter-access node interfaces, e.g. the inter-BS interface X2 according to the 3GPP specifications. For example, this could be accomplished during handovers, or it could be provided by the O&M system. The maximum backhaul capacity, which may be several Gbps for fiber, several hundreds of Mbps for DSL, several tens of Mbps for microwave, or several Mbps for leased lines, could even be preconfigured at system setup.

The backhaul capacity of the serving access node may be a limiting factor as well. The more supporting access nodes are cooperating with the serving access node, the more data has to be received by the serving access node. Thus, the backhaul limitation of the serving access node may serve as parameter to limit the number of supporting access nodes. Accordingly, the list of candidates may be limited to the maximum number of supporting access nodes that can be handled by the backhaul capacity of the serving access node.

Wireless communication protocols typically contain various more or less strict timing constraints regarding, e.g. Automatic Repeat Request (ARQ) feedback or re-transmissions, measurements reports, random access, or the like. Cooperative communication has to meet basically the same tight timing constraints. Thus, the latency of the backhaul information exchange can serve as a parameter to select supporting access nodes. According to some embodiments, the list of candidates may thus be reduced to access nodes whose latency (or the latency of the transport network providing the connection for cooperation) is below a certain limit. A tough limit may lead to a situation in which a given access node only cooperates with co-channel access nodes to which it has a direct physical link. The information about the latency could be provided by the O&M system or it could be preconfigured at system setup. In IP networks, the serving access node can gather round-trip times, e.g., by sending Internet Control Message Protocol (ICMP) echo request packets to the potentially supporting BS and listening for ICMP "echo response" (also known as "ping"). As an alternative or in addition, the serving access node can measure the response time with respect to other access nodes during communication via a BS-BS interface, e.g. the inter-BS interface X2 according to the 3GPP specifications. For example, this may be accomplished during handovers.

If more than one mobile terminal requires cooperation the sets of potentially supporting access nodes may influence each other. For instance if a co-channel access node is part of two different sets, it might be beneficial to cooperate with this access nodes for both mobile terminals. In this case, a signalling overhead may be reduced because the exchanged data, e.g. the request messages 22 and the response messages 24, or the subscribe messages 22' and the publish messages 24', may carry information of both mobile terminals at once.

It is to be understood that the order of above-described steps can be modified based on the priorities of vendors/operators or based on the implementation or that only some of the above described steps may be used.

Accordingly, determining a set of one or more supporting access nodes to be used for access-node cooperation in DL signal communication as described herein may be accomplished based on at least one of the following selection criteria:

- a characteristic, e.g. quality, load, and/or latency, of a link between the mobile terminal 200 and the serving access node 100-1 as compared to a characteristic of a link between the mobile terminal 200 and at least one further access node,
- a characteristic of a link, e.g. quality, load, and/or latency, between the serving access node and at least one further one further access node,
- a capacity of the serving access node,
- a relation of at least one further access node to the mobile terminal 200 and to at least one further mobile terminal,
- location information of at least one further access node in relation to location information of the serving access node,
- operation and maintenance information related to at least one further access node, and
- pre-configuration information related to at least one further access node.

If necessary, information relating to the above-mentioned criteria may be sent from further access nodes, which are potentially suited as supporting access nodes, to the serving access nodes 100-1.

Having compiled the final set of potentially cooperating access nodes, the serving access node requests 100-1 cooperation from all access nodes of that set. This may be accomplished by exchanging messages according to a request-response mechanism or according to a subscribe-publish mechanism and may be performed individually for each of the supporting access nodes. However, it is to be understood, that unicast messages, multicast messages and/or broadcast messages may be used as appropriate in order to efficiently use network capacities.

Figure 4:
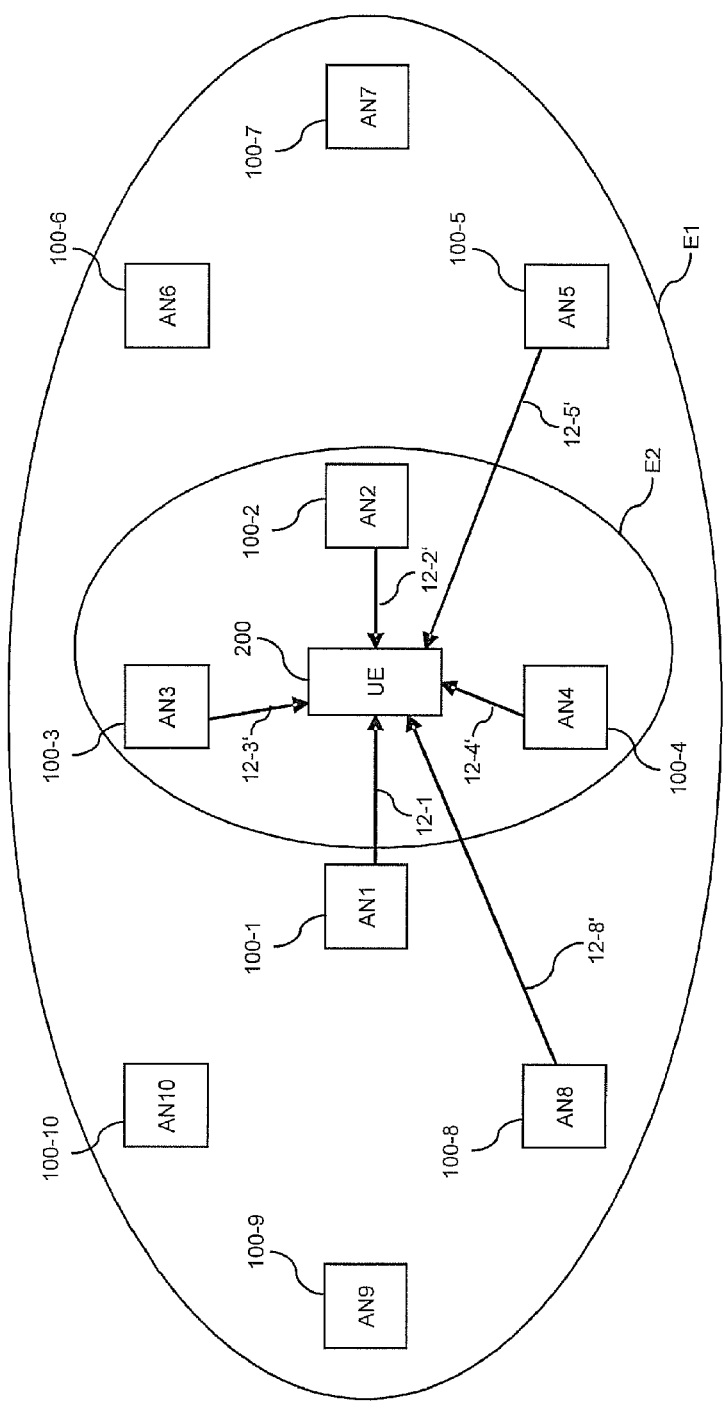
FIG. 4 schematically illustrates a mobile terminal and an ensemble of access nodes, from which a set of access nodes is selected for DL cooperation with respect to the mobile terminal.
Figure 5:
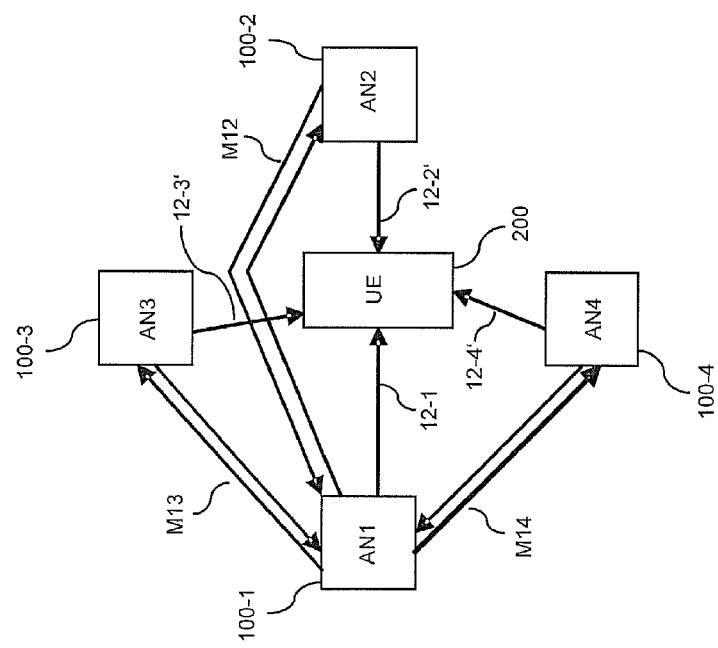
FIG. 5 schematically illustrates the set of selected of access nodes in FIG. 4 and communication between access nodes of the set and the mobile terminal.

The above concepts of selecting cooperating access nodes are further illustrated in FIGS. 4 and 5.

FIG. 4 depicts an ensemble E1 of access nodes 100-1, 100-2, 100-3, 100-4, 100-5, 100-6, 100-7, 100-8, 100-9, 100-10 (AN1-AN10) of a communication network, and a mobile terminal 200. The access nodes 100-1, 100-2, 100-3, 100-4, 100-5, 100-6, 100-7, 100-8, 100-9, 100-10 and the mobile terminal 200 may be similar to the access nodes and mobile terminals of FIGS. 1 and 2. The access node 100-1 is the serving access node for the mobile terminal 200. The mobile terminal 200 receives a communication signal 12-1 from its serving access node, i.e. the access node 100-1, and receives interfering signals 12-2', 12-3', 12-4', 12-5', and 12-8' from the access nodes 100-2, 100-3, 100-4, 100-5, and 100-8, respectively. The serving access node 100-1 can determine a set E2 of one or more access nodes of the ensemble E1 that are suited for supporting the serving access node 100-1 in DL signal communication with the mobile terminal 200 and are therefore selected as supporting access nodes. According to the example, the serving access node 100-1 selects the access nodes 100-2, 100-3, and 100-4 for the set E2 and excludes the remaining access nodes, 100-5, 100-6, 100-7, 100-8, 100-9, 100-10. This decision may based on a characteristic of a respective link between the mobile terminal 200 and the access nodes 100-2, 100-3, 100-4, 100-5, 100-6, 100-7, 100-8, 100-9, 100-10. Further, this decision may be based on knowing the location of the mobile terminal 200 which might be too distant from any of the remaining access nodes to receive an interfering signal at significant signal strength.

In FIG. 5, messages M12, M13, and M14 exchanged between the serving access node 100-1 and the supporting access nodes 100-2, 100-3, and 100-4, respectively, of set E2 are shown. As mentioned above the exchanged messages may be request messages and response messages or subscribe messages and publish messages, and have the purpose of requesting and receiving scheduling information pertaining to signal communication of the supporting access nodes to respective associated further mobile terminals (not illustrated). It is to be understood that the situation as illustrated in FIGS. 4 and 5 is merely exemplary. As compared to the illustrated situation, in which the set E2 consists of three access nodes, other situations may have only one access node, two access nodes, or more than three access nodes in the set E2. Also, it is to be understood that the total number of access nodes in the communication network may be different.

In the following, processes of access node cooperation in DL signal communication according to embodiments of the invention will be described. In these processes, it is assumed that a supporting access node was already selected, e.g. using criteria and processes as explained above.

Figure 6:
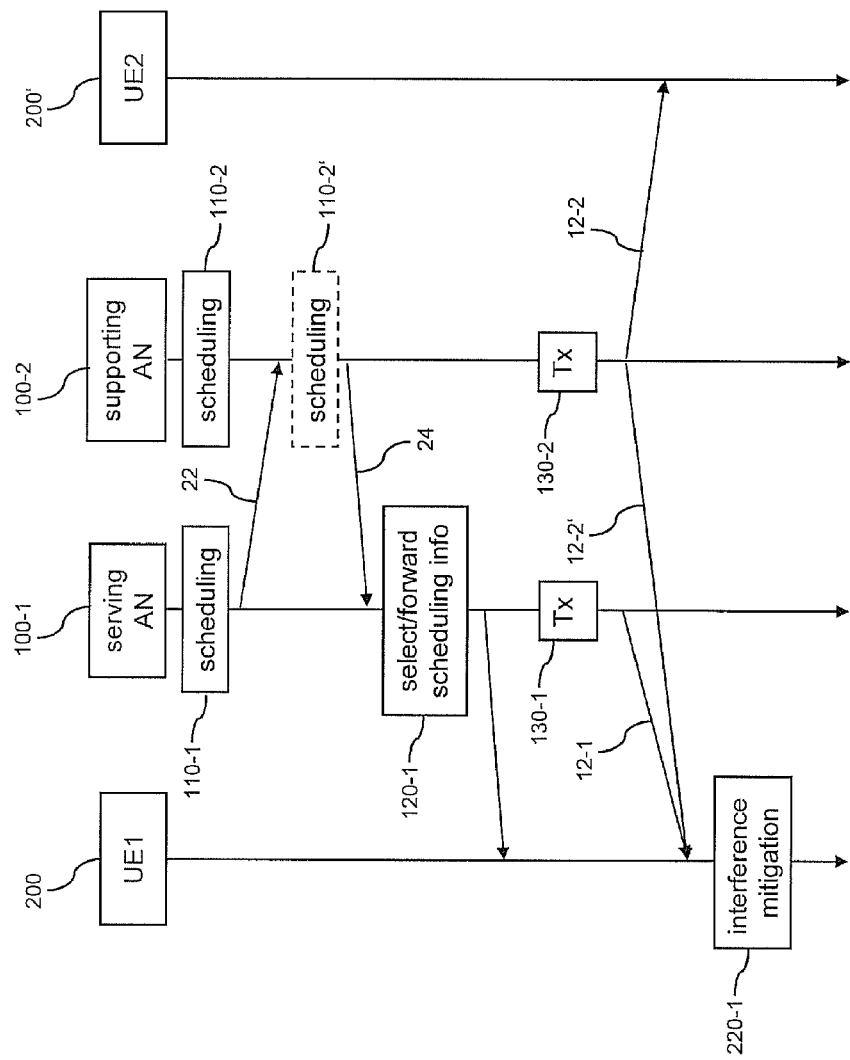
FIG. 6 schematically illustrates a process for access-node cooperation in DL signal communication according to an embodiment of the invention.

FIG. 6 schematically illustrates, in the form of a signalling diagram, a process of access node cooperation in DL signal communication which is based on a request-response mechanism. The process involves a mobile terminal (UE1) 200, a serving access node 100-1, a supporting access node 100-2, and a further mobile terminal (UE2) 200', which may be similar to the respective devices as explained in connection with FIGS. 1 and 2.

The mobile terminal 200 is associated with the serving access node 100-1. The serving access node 100-1 controls communication with the mobile terminal 200. Specifically, the serving access node 100-1 controls scheduling of signal communication to the mobile terminal 200. This comprises, in scheduling step 110-1, determining scheduling information of the serving access node 100-1, e.g. a modulation scheme, a coding scheme, a precoding matrix, a reference signal, a transmit power, a frequency resource allocation, and/or a time resource allocation, used for signal communication from the serving access node 100-1 to the mobile terminal 200. The further mobile terminal 200' is associated with the supporting access node 100-2, i.e. the supporting access node is the serving access node of the further terminal and controls communication with the further mobile terminal 200'. This comprises, in scheduling step 110-2, determining scheduling information of the supporting access node 100-2, e.g. a coding scheme, a precoding matrix, a reference signal, a transmit power, a frequency resource allocation, and/or a time resource allocation used for signal communication from the supporting access node 100-2 to the further mobile terminal 200'.

The mobile terminal 200 has already been identified as a candidate for cooperation. The access node 100-2 has already been selected as supporting access node for the mobile terminal 200. Having accomplished scheduling of the signal communication to the mobile terminal 200, the serving access node 100-1 makes a request for support from the supporting access node 100-2 with respect to the mobile terminal 200, by sending a request message 22 to the supporting access node 100-2, to obtain the scheduling information of the supporting access node 100-2. The request message 22 may indicate which type of scheduling information is required, i.e. may specify certain items of the scheduling information. Further, the request message 22 may also comprise information relating to scheduling information of the serving access node 100-1, e.g. indicate a frequency resource allocation and/or a time resource allocation used for the signal communication from the serving access node 100-1 to the mobile terminal 200. Further, the request 22 may also comprise additional information, e.g. with respect to an estimated signal quality of the interfering signal 12-2' the mobile terminal 200 receives from the supporting access node 100-2, e.g. in terms of a signal-to-noise ratio.

In response to the request message 22, in scheduling step 110-2', the supporting access node 100-2 may optionally re-schedule the signal communication to the further mobile terminal 200', taking into account the information provided in the request message 22. For example, if the request message 22 indicates a frequency resource allocation and/or a time resource allocation used for the signal communication from the serving access node 100-1 to the mobile terminal 200, the supporting access node 100-2 may re-schedule the signal communication to the further mobile terminal 200' so as to use a different frequency resource allocation and/or time resource allocation, which may help to avoid interference. If the request message 22 indicates an estimated signal quality of the interfering signal 12-2' as received at the mobile terminal 200, the supporting access node 100-2 may re-schedule the signal communication to the further mobile terminal 200'. For example, the transmit power may be increased or the modulation and/or coding scheme may be adapted, which may facilitate processing of the interfering signal 12-2' at the mobile terminal 200, or the transmit power may be decreased, which may help to avoid interference. The supporting-access node 100-2 may decide on how to adjust the transmit power depending on the estimated value of the signal quality, e.g. by comparing the estimated value of the signal quality to one or more threshold values. For example, if the estimated value of the signal quality is below a low threshold value, the supporting access node 100-2 may accomplish re-scheduling so as to reduce the transmit power. Further, if the estimated value of the signal quality is above a low threshold value and below a high threshold value, the supporting access node 100-2 may accomplish re-scheduling so as to increase the transmit power. Further, if the estimated value of the signal quality is above a high threshold value, the supporting access node 100-2 may refrain from performing re-scheduling. Further, the supporting access node may accomplish re-scheduling so as to adjust the modulation scheme and/or coding scheme. For example, if the estimated value of the signal quality is below a threshold value, a lower order modulation and/or a coding scheme having higher redundancy may be selected.

It is to be understood that the decision of the supporting access node 100-2 whether and how to accomplish re-scheduling may depend on other criteria as well, e.g. on the availability of resources for scheduling the signal communication to the further mobile terminal 200', which may be limited due to other mobile terminals (not illustrated) which communicate with the supporting access node 100-2. Also, it is to be understood that, if the supporting access node 100-2 receives the request message 22 and scheduling of the signal communication to the further mobile terminal 200' has not been accomplished yet, this may be done in scheduling step 110-2', which means that scheduling step 110-2' will accomplish rather scheduling than re-scheduling.

The supporting access node 100-2 then sends a response message 24 to the serving access node 100-1, which includes at least a part of the scheduling information of the supporting access node 100-2 as determined in the last scheduling step 110-2 or 110-2'. The supporting access node 100-2 may respond with all available scheduling information pertaining to the signal communication to the further mobile terminal 200'. According to some embodiments, the supporting access node may also respond with certain types or items of scheduling information, which have been selected from the available scheduling information of the supporting access node 100-2, e.g. according to information in the request message 22. In some embodiments, the response message 24 may also include further information, e.g. scheduling information of the supporting access node 100-2 pertaining to signal communication to another mobile terminal (not illustrated). In other words, in the response message 24, the requested scheduling information may be communicated along with other information, which allows for an efficient usage of signalling between the serving access node 100-1 and the supporting access node 100-2. In some cases, the supporting access node 100-2 may also refrain from sending the response message 24.

The serving access node 100-1 receives the response message 24 with the included scheduling information. At selection/forwarding step 120-1, the serving access node 100-1 forwards at least a part of the received scheduling information to the mobile terminal 200. The serving access node 100-1 may forward all received scheduling information. According to some embodiments, the serving access node 100-1 may also forward certain types or items of scheduling information, which have been selected from the received scheduling information, e.g. according to requirements of the mobile terminal 200 for accomplishing interference mitigation. For example, if the interference mitigation process implemented at the mobile terminal 200 is based on interference cancellation, the serving access node 100-1 will typically request all available scheduling information pertaining to the signal communication to the further mobile terminal 200' and forward all received scheduling information to the mobile terminal 200. If the interference mitigation process implemented at the mobile terminal 200 is based on interference rejection combining, the serving access node 100-1 in some cases may forward only a transmit power and a precoding matrix as indicated in the scheduling information of the supporting access node 100-2. Other types of scheduling information may nonetheless be requested and received from the supporting access node 100-2, e.g. if they are needed for cooperation with respect to another mobile terminal (not illustrated) associated with the serving access node. From time to time, the serving access node 100-1 may also decide not to forward any scheduling information, e.g. if the scheduling information is not needed by the mobile terminal 200.

Accordingly, the cooperation process may involve selection of scheduling information to be requested by the serving access node 100-1 from the supporting access node 100-2, selection of scheduling information to be communicated from the supporting access node 100-2 to the serving access node 100-1, and filtering or selection of scheduling information to be forwarded by the serving access node 100-1 to the mobile terminal 200.

Forwarding the scheduling information to the mobile terminal 200 may be accomplished using a control channel between the serving access node 100-1 and the mobile terminal 200, e.g. the PDCCH in LTE, or a data channel, e.g. the PDSCH in LTE.

The mobile terminal 200 receives the forwarded scheduling information from the serving access node 100-1.

At transmission step 130-1, the serving access node 100-1 transmits a communication signal 12-1 to the mobile terminal 200. At about the same time, i.e. using the same time resource allocation, the supporting access node 100-2 transmits a communication signal 12-2 to the further mobile terminal 200'. The communication signal 12-2 is received as an interfering signal 12-2' at the mobile terminal 200. Due to interference the communication signal 12-1 as received at the mobile terminal 200 includes signal portions of the interfering signal 12-2' as well.

At interference mitigation step 220-1, the mobile terminal 200 removes at least a signal portion of the interfering signal 12-2' from the communication signal as received. According to some embodiments, this process is based on interference cancellation and involves decoding of the interfering signal 12-2' as received by the mobile terminal 200, which is accomplished on the basis of the scheduling information of the supporting access node 100-2. According to further embodiments, this process is based on interference rejection combining and involves calculating an interference covariance matrix of the interfering signal 12-2' as received at the mobile terminal 200, which is accomplished on the basis of the scheduling information of the supporting access node 100-2. Further details of the interference mitigation using interference cancellation or the interference mitigation using interference rejection combining will be explained below.

In interference-cancellation based processes as used according to embodiments of the invention, the mobile terminal 200 detects, demodulates and decodes the interfering signal 12-2'. If the interfering signal is correctly decoded, it is re-modulated and subtracted from the communication signal 12-1 as received at the mobile terminal 200. In this way a signal portion in the received communication signal 12-1, which is due to the interfering signal 12-2', may be cancelled.

For the purpose of decoding the interfering signal 12-2', the mobile terminal 200 is provided with the same information as the further mobile terminal 200' uses for decoding the communication signal 12-2, from which the interfering signal 12-2' originates. This is accomplished by providing the mobile terminal 200 with the scheduling information of the supporting access node 100-2 with respect to the communication signal 12-2 transmitted to the further mobile terminal 200'. In embodiments using interference-cancellation based processes, the scheduling information forwarded to the mobile terminal typically comprises allocated frequency RBs, allocated time slots or transmission time intervals (TTIs), a transmit power, a modulation scheme, a coding scheme, a precoding matrix or PMI, a rank indicator, reference signals or symbols, and redundancy information, e.g. a HARQ version.

As mentioned above, it is also beneficial if the interfering signal 12-2' as received by the mobile terminal 200 has sufficiently good quality, e.g. in terms of signal to noise ratio, which facilitates detection, demodulation and decoding. This may be considered already when selecting the mobile terminal 200 for cooperation and/or when selecting the supporting access node 100-2. In other words, if it can be expected that interference cancellation at the mobile terminal 200 with respect to the interfering signal from a further access node is not effective due to insufficient signal quality of the interfering signal as received by the mobile terminal 200, it may be refrained from using cooperation for this mobile terminal 200 or it may be refrained from selecting this further access node as the supporting access node 100-2. Further, this can be considered at the supporting access node 100-2. For example, if information in the request 22 received by the supporting access node indicates that it can be expected that interference cancellation at the mobile terminal 200 with respect to the interfering signal from the supporting access node 100-2 is not effective, the supporting access node may refrain from responding to the request 22. Moreover, if can be expected that interference cancellation at the mobile terminal 200 with respect to the interfering signal from the supporting access node 100-2 is not effective, the serving access node 100-1 may refrain from forwarding already received scheduling information of the supporting access node 100-2.

In interference-rejection combining based processes as used according to embodiments of the invention, the mobile terminal 200 receives the communication signal 12-1 and the interfering signal 12-2' on multiple channels corresponding to different antennas and uses spatial suppression to mitigate interference. For this purpose, the mobile terminal 200 may calculate an interference covariance matrix of the interfering signal, which is accomplished using the received scheduling information of the supporting access node.

In some embodiments, the mobile terminal 200 may use the transmit power, the frequency resource allocation and/or the time resource allocation used by the supporting access node 100-2 for signal communication to the further mobile terminal 200', as indicated in the received scheduling information, and channel coefficients, e.g. per frequency resource and/or time resource, to calculate the channel covariance matrix. The channel coefficients can in turn be measured based on reference signals or symbols transmitted by the supporting access node 100-2 and indicated in the received scheduling information.

In some embodiments, e.g. if the access nodes and the mobile terminals operate based on cell-specific reference signals according to LTE, a precoding matrix is used for payload data transmission while the cell-specific reference signals are transmitted without precoding. In this case, the mobile terminal may also use the precoding matrix, used at the supporting access node 100-2 for signal communication to the further mobile terminal 200', to calculate the interference covariance matrix of the interfering signal 12-2'. The precoding matrix is then included in the scheduling information forwarded to the mobile terminal.

In some embodiments, e.g. if the access nodes and the mobile terminals operate based on UE-specific reference signals according to LTE, a precoding matrix is used for payload data transmission as well as for the UE-specific reference signals. In this case, the mobile terminal 200 may also use the UE-specific reference signals, used at the supporting access node 100-2 for signal communication to the further mobile terminal 200', to calculate the interference covariance matrix of the interfering signal 12-2'. Information about the UE-specific reference signals is then included in the scheduling information forwarded to the mobile terminal 200.

According to some embodiments, a channel covariance matrix is calculated according to $$C_{nn,k} = E[y_k y_k^H] - P_{serv,k} w_{serv,k} h_{serv,k} h_{serv,k}^H, \qquad (1)$$

where $E[\ldots]$ denotes an expectation value function, $y_k$ denotes the received signal on subcarrier k, $P_{serv,k}$ and $w_{serv,k}$ denote the transmit power and precoding vector used for the payload data on subcarrier k, and $h_{serv,k}$ denotes the channel coefficient from the serving access node to the considered mobile terminal 200 on subcarrier k.

Accordingly, in some embodiments, the mobile terminal 200 may perform channel measurements based on the reference signals or symbols in the interfering signal so as to accurately determine the channel coefficients and use these channel coefficients and the received precoding matrix to calculate a precise interference covariance matrix of known interfering signals according to $$C_{ii,k} = \sum_{i \in known\ interferers} P_{i,k} w_{i,k} h_{i,k} h_{i,k}^H, \quad (2)$$

where $P_{i,k}$, $w_{i,k}$ denote the transmit power and the precoding vector of the interfering signal 'i' on subcarrier k, and $h_{i,k}$ denotes the channel coefficient from the interferer 'i' to the considered mobile terminal 200 on subcarrier k. In equations (1) and (2), the superscript index $(\ )^H$ is used to denote a conjugated complex and transposed vector.

The channel covariance matrix may then be deduced from the calculated interference covariance matrix and used to remove at least a signal portion of the interfering signal 12-2' from the communication signal 12-1 as received by the mobile terminal 200, is accomplished by subjecting the communication signal 12-1 and the interfering signal 12-2' to a multi-channel filtering process using the inverse channel covariance matrix.

In the above, the concept of cooperation is illustrated for only one supporting access node 100-2. If the serving access node 100-1 has identified multiple supporting access nodes, the illustrated process may be individually performed for each supporting access node. That is to say, the serving access node 100-1 requests cooperation from each supporting access node. The request messages 22 can be transmitted as unicast message, as multicast message or, depending on the circumstances, even as broadcast message. Each supporting access node responds with the requested scheduling information. Further, each supporting access node may cancel or disregard the request.

Figure 7:
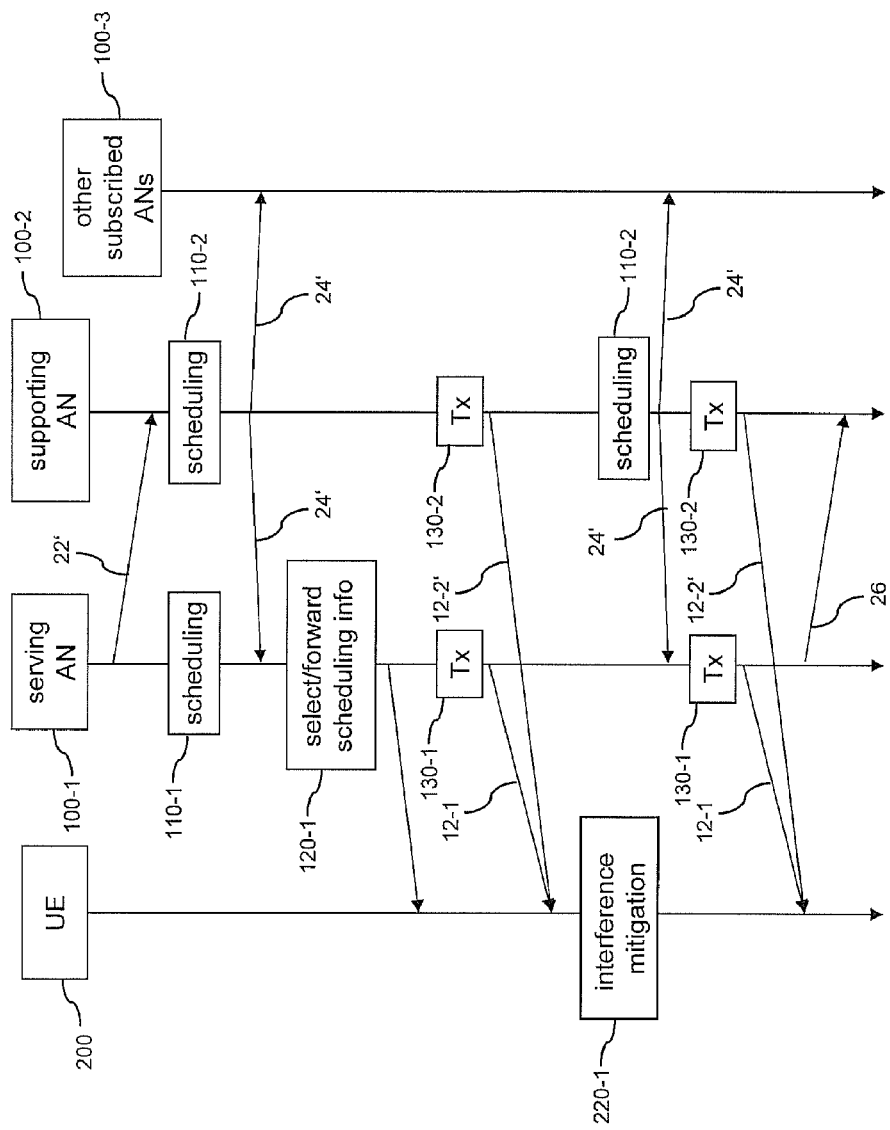
FIG. 7 schematically illustrates a further process for access-node cooperation in DL signal communication according to an embodiment of the invention.

The process as illustrated in FIG. 6 is based on a request-response mechanism, in which the serving access node sends a request message and the supporting access node responds with a response message including the requested scheduling information. The request-response mechanism allows for using backhaul capacity between the access nodes in an efficient manner since the scheduling information can be requested and transmitted only to the extent in which it is actually needed. In some embodiments, the request-response mechanism may be replaced by a subscribe-publish mechanism. A corresponding process is illustrated in FIG. 7. The process of FIG. 7 involves a mobile terminal (UE) 200, a serving access node 100-1, a supporting access node 100-2, and further subscribed access nodes 100-3'. For a better overview, a further mobile terminal associated with the supporting access node 100-2 is not illustrated. These devices may be similar to the respective devices as explained in connection with FIGS. 1 and 2.

In the process of FIG. 7, which is based on the subscribe-publish mechanism, the supporting access node 100-2 offers a service "transfer of scheduling information", i.e. to publish its scheduling information pertaining to signal communication to the further mobile terminal, to other access nodes. The scheduling information is communicated to those access nodes that have subscribed to this service, i.e. to the serving access node 100-1 and to the other subscribed access nodes 100-3. This offer, which may also comprise additional information, e.g. capabilities of the access node 100-2 such as backhaul constraints, may be announced to other access nodes directly or to an O&M system of the communication network. Interested access nodes, in the illustrated example the serving access node 100-1 and the other subscribed access nodes 100-3, subscribe to the offered service which means that the access node 100-2 becomes a supporting access node with respect to these access nodes.

As illustrated, for subscribing to the service offered by the supporting access node 100-2, the serving access node 100-1 sends a subscribe message 22' to the supporting access node 100-2, and the supporting access node then transmits at least one publish message 24' including the published scheduling information to the serving access node 100-1. Publish messages 24' may be sent several times with further, updated scheduling information relating to the signal communication of the supporting access node 100-2 to its associated mobile terminal. The publish messages 24' may be sent to several of the subscribed access nodes 100-1, 100-3 at the same time, e.g. as multicast or broadcast messages. Transmitting the publish messages 24' may be stopped in response to the serving access node 100-1 sending an unsubscribe message 26 to the supporting access node 100-2.

The publish messages 24' include at least a part of the scheduling information of the supporting access node 100-2 as determined in the last scheduling step 110-2. A new publish message 24' may be sent each time the supporting access node 100-2 determines new scheduling information, i.e. performs scheduling of the signal communication to its associated further mobile terminal in scheduling steps 110-2. The supporting access node 100-2 may publish all available scheduling information pertaining to the signal communication to its associated further mobile terminal. According to some embodiments, the supporting access node 100-2 may also publish certain types or items of scheduling information, which have been selected from the available scheduling information of the supporting access node 100-2. In some embodiments, the publish message 24' may also include further information, e.g. scheduling information of the supporting access node 100-2 pertaining to signal communication to another associated mobile terminal (not illustrated). In other words, in the publish message 24', the requested scheduling information may be communicated along with other information, which allows for an efficient usage of signalling between the serving access node 100-1 and the supporting access node 100-2.

The serving access node 100-1 receives the publish message 24' with the included scheduling information. At selection/forwarding step 120-1, the serving access node 100-1 forwards at least a part of the received scheduling information to the mobile terminal 200. The serving access node 100-1 may forward all received scheduling information. According to some embodiments, the serving access node 100-1 may also forward only certain types or items of scheduling information, which have been selected from the received scheduling information, e.g. according to requirements of the mobile terminal 200 for accomplishing interference mitigation. For example, if the interference mitigation process implemented at the mobile terminal 200 is based on interference cancellation, the publish message 24' will typically include all available scheduling information pertaining to the signal communication of the supporting access node 100-2 to its associated further mobile terminal, and the serving access node will typically forward all received scheduling information to the mobile terminal 200. If the interference mitigation process implemented at the mobile terminal 200 is based on interference rejection combining, the serving access node 100-1 may forward only a transmit power and a precoding matrix as indicated in the scheduling information of the supporting access node 100-2. Other types scheduling information may nonetheless be received from the supporting access node 100-2, e.g. if they are needed for cooperation with respect to another mobile terminal (not illustrated) associated with the serving access node. From time to time, the serving access node 100-1 may also decide not to forward any scheduling information, e.g. if the scheduling information is not needed by the mobile terminal 200.

Accordingly, the cooperation process of FIG. 7 may involve filtering or selection of scheduling information to be forwarded by the serving access node 100-1 to the mobile terminal 200.

Forwarding the scheduling information to the mobile terminal 200 may be accomplished using a control channel between the serving access node 100-1 and the mobile terminal 200, e.g. the PDCCH in LTE or the data channels between the serving access node 100-1 and the mobile terminal 200, e.g., the PDSCH in LTE.

The mobile terminal 200 receives the forwarded scheduling information from the serving access node 100-1.

At transmission step 130-1, the serving access node 100-1 transmits a communication signal 12-1 to the mobile terminal 200. At about the same time, i.e. using the same time resource allocation, the supporting access node 100-2 transmits a communication signal 12-2 to the further mobile terminal 200'. The communication signal 12-2 is received as an interfering signal 12-2' at the mobile terminal 200. Due to interference between the communication signal 12-1 as received at the mobile terminal 200 includes signal portions of the interfering signal 12-2' as well.

At interference mitigation step 220-1, the mobile terminal 200 removes at least a signal portion of the interfering signal 12-2' from the communication signal as received, which is accomplished using the received scheduling information of the supporting access node. The interference mitigation step 220-1 may be implemented as explained in connection with FIG. 6.

The subscription of the serving access node 100-1 to the service "transfer of scheduling information" offered by the supporting access node 100-2 may be cancelled when the scheduling information of the supporting access node 100-2 is no longer needed by the serving access node 100-1. For this purpose, the serving access node 100-1 may send the unsubscribe message 26. Other cancelling procedures may be used as an alternative or in addition.

The subscribe-publish mechanism allows for establishing long-term relationships between access nodes with reduced overhead. Further, the serving access node 100-1 may obtain updated scheduling information as soon at it becomes available at the supporting access node 100-2.

Figure 8:
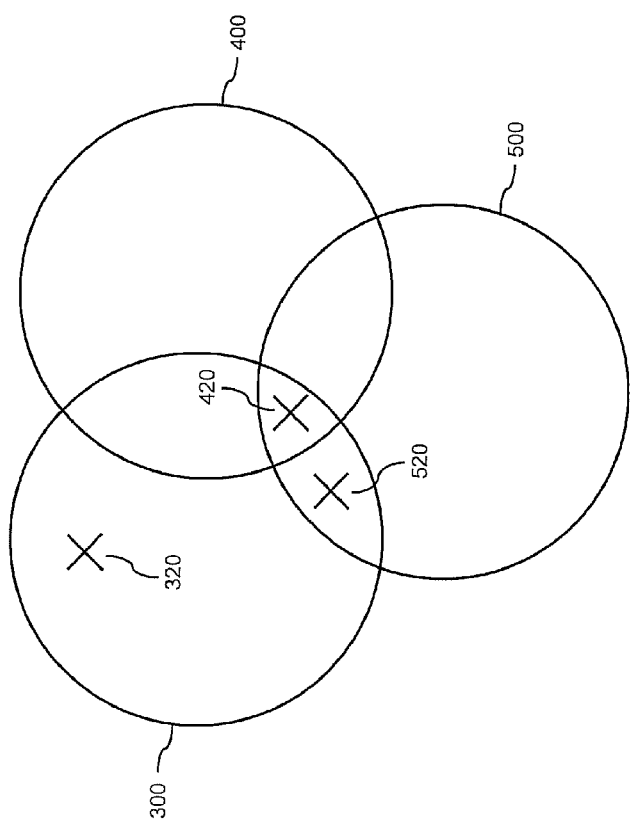
FIG. 8 schematically illustrates an exemplary scenario of access-node cooperation using the process of FIG. 7.

FIG. 8 shows an exemplary scenario of access-node cooperation using the process of FIG. 7. In FIG. 8 circles schematically illustrate coverage areas of communication signals transmitted by access nodes, whereas crosses indicate positions of mobile terminals to which the communication signals are transmitted. In particular, the position of a first mobile terminal is denoted by 320 and the coverage area of a communication signal transmitted by a serving access node of the first mobile terminal 320 is denoted by 300. Similarly, the position of a second mobile terminal is denoted by 420 and the coverage area of a communication signal transmitted by a serving access node of the second mobile terminal 420 is denoted by 400, and the position of a third mobile terminal is denoted by 520 and the coverage area of a communication signal transmitted by a serving access node of the third mobile terminal 520 is denoted by 500. In overlapping areas of the coverage areas 300, 400, 500, interference of the communication signals can be expected. As can be seen, the mobile terminal 420 can be expected to experience interference due to the communication signals transmitted by the serving access nodes of both other mobile terminals 320, 520. The mobile terminal 320 can be expected to experience no interference at all. Accordingly, the serving access node of the mobile terminal 420 cooperates with the serving access nodes of both other mobile terminals 320, 520, and the serving access node of the mobile terminal 420 cooperates with the serving access node of the mobile terminal 320. The serving access node of the mobile terminal 320 does not cooperate with any of the other access nodes. Each off the access nodes offers a service "transfer of scheduling information" as described in connection with FIG. 7.

In the example illustrated by FIG. 8, the group of subscribers for the service "transfer of scheduling information" offered by the serving access node of the mobile terminal 320, corresponding to coverage area 300, comprises the serving access node of the mobile terminal 420, corresponding to coverage area 400, and the serving access node of the mobile terminal 520, corresponding to coverage area 500. Only the serving access node of the mobile terminal 420, corresponding to the coverage area 400, is subscribed to the service "transfer of scheduling information" offered by the serving access node of the mobile terminal 520, corresponding to the coverage area 500. There is no subscriber of the service "transfer of scheduling information" offered by the serving access node of the mobile terminal 420, corresponding to the coverage area 400. Accordingly, the serving access node of the mobile terminal 420 does not need to publish its scheduling information at all.

Figure 9:
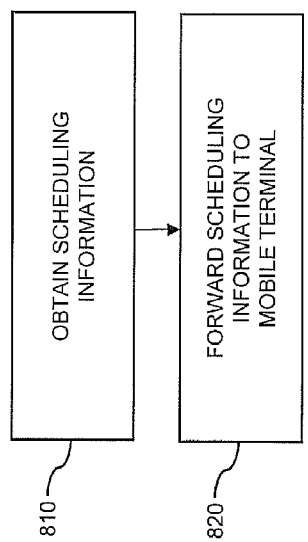
FIG. 9 shows a flowchart for schematically illustrating an access-node based method according to an embodiment of the invention.

FIG. 9 shows a flowchart for schematically illustrating an access-node based method according to an embodiment of the invention, which may be used to implement the functionalities of a serving access node as explained above. In this method, the serving access node is associated with a mobile terminal and controls DL signal communication to the mobile terminal.

In step 810, the serving access node obtains scheduling information. The scheduling information may be obtained from a scheduling process accomplished by the serving access node itself or may be obtained from a supporting access node. The scheduling information pertains to signal communication to a further mobile terminal, e.g. from the serving access node to the further mobile terminal or from the supporting access node to the further mobile terminal. The supporting access node may have been selected by the serving access node according to the concepts as described above, e.g. in connection with FIGS. 4 and 5. The scheduling information may indicate a modulation scheme, a coding scheme, a precoding matrix, a reference signal, a transmit power, a frequency resource allocation, and/or a time resource allocation used for said signal communication from the supporting access node to the further mobile terminal. The scheduling information may be received from the supporting access node using a response request mechanism, e.g. as explained in connection with FIG. 6, or may be received using a subscribe-publish mechanism, e.g. as explained in connection with FIG. 7.

In step 820, the serving access node forwards the obtained scheduling information to the mobile terminal, where the forwarded scheduling information may be used for interference mitigation.

Figure 10:
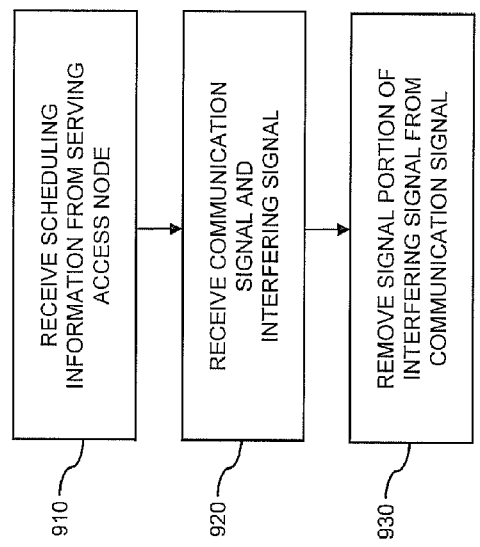
FIG. 10 shows a flowchart for schematically illustrating a mobile-terminal based method according to an embodiment of the invention.

FIG. 10 shows a flowchart for schematically illustrating a mobile-terminal based method according to an embodiment of the invention, which may be used to implement the functionalities of a mobile terminal as explained above. In this method, a serving access node associated with the mobile terminal controls DL signal communication to the mobile terminal.

In step 910, the mobile terminal receives, from the serving access node, scheduling information. The scheduling information pertains to signal communication to a further mobile terminal, e.g. signal communication from the serving access node to the further mobile terminal or signal communication from the supporting access node to the further mobile terminal. The scheduling information may indicate a modulation scheme, a coding scheme, a precoding matrix, a reference signal, a transmit power, a frequency resource allocation, and/or a time resource allocation used for said signal communication from the supporting access node to the further mobile terminal.

In step 920, the mobile terminal receives a communication signal from the serving access node and an interfering signal due to the signal communication to the further mobile terminal. The interfering signal may originate from a communication signal transmitted by the serving access node or supporting access node to the further mobile terminal, at least in part using the same resources as used for transmitting the communication signal from the serving access node to the mobile terminal.

In step 930, the mobile terminal 200 uses the received scheduling information to remove at least a signal portion of the interfering signal from the communication signal, which may be accomplished on the basis of an interference-cancellation based process or on an interference-rejection combining based process as explained above.

According to some embodiments, the methods of FIGS. 9 and 10 may be combined with each other. In particular, the scheduling information as received by the mobile terminal in the method of FIG. 10 may have been forwarded according to the method of FIG. 9.

It is to be understood that the above concepts, examples and embodiments are merely illustrative and are susceptible to various modifications. For example, in the above-described methods and processes, steps or procedures may be executed according to the order as described or in a different order. Further, it is also possible to omit certain steps or procedures without departing from the scope of the present disclosure. The described functionalities of devices may be implemented by computer programs to be executed by a processor, e.g. the respective processors of the access nodes and the mobile terminals as described above, or may be implemented by dedicated hardware. Moreover, individual features of different examples or embodiments may be combined with each other as appropriate. In particular, the interference mitigation processes as explained in detail in connection with FIG. 6 may also be used in the multi user MIMO interference scenario of FIG. 3.

The invention claimed is:

1. A method for downlink signal communication from a serving access node to a first mobile terminal associated with the serving access node, the method comprising the serving access node:
obtaining scheduling information pertaining to signal communication to a second mobile terminal;
forwarding the obtained scheduling information to the first mobile terminal so as to allow for using the scheduling information for interference mitigation at the first mobile terminal;
wherein the scheduling information indicates at least one of a frequency resource allocation and a time resource allocation used for the signal communications to the second mobile terminal.

2. The method of claim 1 wherein the scheduling information further indicates at least one of a modulation scheme, a coding scheme, a precoding matrix, a reference signal, and a transmit power, used for the signal communication to the second mobile terminal.

3. The method of claim 1 wherein the scheduling information pertains to signal communication from the serving access node the second mobile terminal.

4. The method of claim 1 wherein the scheduling information pertains to signal communication from a supporting access node to the second mobile terminal.

5. The method of claim 4 further comprising:
determining a characteristic of a link between a further access node and the first mobile terminal;
selecting, on the basis of the determined characteristic, the further access node as the supporting access node.

6. The method of claim 4 further comprising sending a message from the serving access node to the supporting access node to receive the scheduling information from the supporting access node.

7. The method of claim 6 wherein the message comprises information relating to further scheduling information pertaining to signal communication from the serving access node to the first mobile terminal.

8. The method of claim 6 wherein the message comprises information on an estimated signal quality of an interfering signal received at the first mobile terminal from the supporting access node.

9. The method of claim 7 further comprising scheduling signal communication from the supporting access node to the second mobile terminal on the basis of the information in the message.

10. The method of claim 1 further comprising sending further scheduling information from the serving access node to at least one further access node, the further scheduling information pertaining to signal communication from the serving access node to the first mobile terminal.

11. The method of claim 10 wherein the further scheduling information indicates at least one of a modulation scheme, a coding scheme, a precoding matrix, a reference signal, a transmit power, a frequency resource allocation, and a time resource allocation, used for the signal communication from the serving access node to the first mobile terminal.

12. A method for downlink signal communication from a serving access node to a first mobile terminal associated with the serving access node, the method comprising the first mobile terminal:
receiving, from the serving access node, scheduling information pertaining to signal communication to a second mobile terminal;
receiving a communication signal from the serving access node;
receiving an interfering signal due to the signal communication to the second mobile terminal;
removing, on the basis of the received scheduling information, at least a signal portion of the interfering signal from the communication signal;
wherein the scheduling information indicates at least one of a frequency resource allocation and a time resource allocation used for the signal communications to the second mobile terminal.

13. The method of claim 12 wherein the removing comprises decoding of the interfering signal on the basis of the received scheduling information.

14. The method of claim 12 wherein the removing comprises determining, on the basis of the received scheduling information, an interference covariance matrix of the interfering signal.

15. A network device configured to operate as a serving access node serving a first mobile terminal, comprising:
a wireless interface for communication with the first mobile terminal;
a processor operatively connected to the interface, the processor configured to:
obtain scheduling information pertaining to signal communication to a second mobile terminal;
forward, via the wireless interface, the obtained scheduling information to the first mobile terminal so as to allow for using the scheduling information for interference mitigation at the first mobile terminal;
wherein the scheduling information indicates at least one of a frequency resource allocation and a time resource allocation used for the signal communications to the second mobile terminal.

16. The network device of claim 15 wherein the scheduling information further indicates at least one of a modulation scheme, a coding scheme, a precoding matrix, a reference signal, and a transmit power, used for the signal communication to the second mobile terminal.

17. A first mobile terminal, comprising:
a wireless interface configured for communication with a serving access node serving the first mobile terminal;
a processor operatively connected to the interface, the processor configured to:
receive, via the wireless interface, scheduling information pertaining to signal communication to a second mobile terminal;
receive, via the wireless interface, a communication signal from the serving access node and an interfering signal due to the signal communication to the second mobile terminal;
remove, on the basis of the received scheduling information, at least a signal portion of the interfering signal from the communication signal;
wherein the scheduling information indicates at least one of a frequency resource allocation and a time resource allocation used for the signal communications to the second mobile terminal.

18. The mobile terminal of claim 17 wherein the scheduling information further indicates at least one of a modulation scheme, a coding scheme, a precoding matrix, a reference signal, and a transmit power, used for the signal communication to the second mobile terminal.

19. A computer program product stored in a non-transient computer readable medium for controlling a processor of a network device, the computer program product comprising software code instructions which, when run on the processor, causes the network device to:
obtain scheduling information pertaining to signal communication to a second mobile terminal;
forward the obtained scheduling information to a first mobile terminal so as to allow for using the scheduling information for interference mitigation at the first mobile terminal;
wherein the scheduling information indicates at least one of a frequency resource allocation and a time resource allocation used for the signal communications to the second mobile terminal.

20. A computer program product stored in a non-transient computer readable medium for controlling a processor of a first mobile terminal, the computer program product comprising software code instructions which, when run on the processor, causes the mobile terminal to:
receive, from a serving access node serving the first mobile terminal, scheduling information pertaining to signal communication to a second mobile terminal;
receive a communication signal from the serving access node;
receive an interfering signal due to the signal communication to the second mobile terminal;
remove, on the basis of the received scheduling information, at least a signal portion of the interfering signal from the communication signal;
wherein the scheduling information indicates at least one of a frequency resource allocation and a time resource allocation used for the signal communications to the second mobile terminal.

21. A system, comprising:
a first mobile terminal;
a serving access node serving the first mobile terminal, the serving access node comprising:
a wireless interface for communication with the first mobile terminal;
a processor operatively connected to the interface, the processor configured to:
obtain scheduling information pertaining to signal communication to a second mobile terminal;
forward, via the wireless interface, the obtained scheduling information to the first mobile terminal so as to allow for using the scheduling information for interference mitigation at the first mobile terminal;
the first mobile terminal comprising:
a wireless interface configured for communication with the serving access node;
a processor operatively connected to the interface, the processor configured to:
receive, via the wireless interface, scheduling information pertaining to signal communication to a second mobile terminal;
receive, via the wireless interface, a communication signal from the network device and an interfering signal due to the signal communication to the second mobile terminal;
remove, on the basis of the received scheduling information, at least a signal portion of the interfering signal from the communication signal;
wherein the scheduling information indicates at least one of a frequency resource allocation and a time resource allocation used for the signal communications to the second mobile terminal.

* * * * *